(12) United States Patent
Senda et al.

(10) Patent No.: US 11,386,830 B2
(45) Date of Patent: Jul. 12, 2022

(54) DISPLAY APPARATUS AND DRIVING METHOD OF DISPLAY APPARATUS

(71) Applicant: SONY SEMICONDUCTOR SOLUTIONS CORPORATION, Kanagawa (JP)

(72) Inventors: Michiru Senda, Kanagawa (JP); Tomoro Yoshinaga, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 21 days.

(21) Appl. No.: 16/645,820

(22) PCT Filed: Aug. 6, 2018

(86) PCT No.: PCT/JP2018/029340
§ 371 (c)(1),
(2) Date: Mar. 10, 2020

(87) PCT Pub. No.: WO2019/058787
PCT Pub. Date: Mar. 28, 2019

(65) Prior Publication Data
US 2020/0279520 A1 Sep. 3, 2020

(30) Foreign Application Priority Data
Sep. 19, 2017 (JP) .............................. JP2017-178527

(51) Int. Cl.
*G09G 3/20* (2006.01)
*H04N 9/31* (2006.01)

(52) U.S. Cl.
CPC ......... *G09G 3/2055* (2013.01); *G09G 3/2025* (2013.01); *H04N 9/312* (2013.01); *H04N 9/3111* (2013.01); *G09G 2310/027* (2013.01)

(58) Field of Classification Search
None
See application file for complete search history.

(56) References Cited

U.S. PATENT DOCUMENTS 6,040,812 A    3/2000  Lewis
6,462,728 B1  10/2002  Janssen et al.
(Continued)

FOREIGN PATENT DOCUMENTS

CN      1577427 A      2/2005
CN    101895772 A    11/2010
(Continued)

OTHER PUBLICATIONS

International Search Report and Written Opinion of PCT Application No. PCT/JP2018/029340, dated Nov. 6, 2018, 15 pages of ISRWO.

*Primary Examiner* — Aneeta Yodichkas
(74) *Attorney, Agent, or Firm* — Chip Law Group

(57) ABSTRACT

A display apparatus includes an addition section, a conversion section, and a control section. The addition section adds a dither signal to a digital image signal for each of a plurality of color components, the digital image signal being generated on a basis of each of the plurality of color components different from each other, and inputted in predetermined order for each sub-frame included in a frame. The conversion section performs digital to analog conversion of converting the digital image signal to which the dither signal is added into an analog image signal. The control section controls a pattern of the dither signal, at each predetermined cycle including a plurality of the sub-frames, depending on the order in which the digital image signal for each of the color components is inputted, within the frame.

11 Claims, 22 Drawing Sheets

(56) References Cited

U.S. PATENT DOCUMENTS

| | | | | |
|---|---|---|---|---|
| 2003/0020725 A1* | 1/2003 | Matsuda | ................ | H04N 5/58 |
| | | | | 345/600 |
| 2004/0140972 A1* | 7/2004 | Hirota | ..................... | G09G 3/20 |
| | | | | 345/204 |
| 2005/0057173 A1 | 3/2005 | Suzuki et al. | | |
| 2010/0295866 A1* | 11/2010 | Ishii | ..................... | H04N 9/3111 |
| | | | | 345/597 |
| 2012/0176556 A1* | 7/2012 | Teshima | ................ | G06F 1/1647 |
| | | | | 348/760 |
| 2014/0368531 A1* | 12/2014 | Small | ..................... | G09G 3/20 |
| | | | | 345/596 |

FOREIGN PATENT DOCUMENTS

| | | |
|---|---|---|
| EP | 0825584 A2 | 2/1998 |
| EP | 1494199 A2 | 1/2005 |
| JP | 10-063233 A | 3/1998 |
| JP | 2000-293149 A | 10/2000 |
| JP | 2003-518267 A | 6/2003 |
| JP | 2003-345288 A | 12/2003 |
| JP | 2004-341356 A | 12/2004 |
| JP | 2005-024912 A | 1/2005 |
| JP | 2008-130522 A | 6/2008 |
| JP | 2009-031817 A | 2/2009 |
| JP | 2011-076098 A | 4/2011 |
| JP | 1719322 B1 | 7/2011 |
| JP | 2012-145684 A | 8/2012 |
| WO | 2001/046940 A1 | 6/2001 |
| WO | 2001/091098 A1 | 11/2001 |
| WO | 2007/043214 A1 | 4/2007 |

* cited by examiner

[FIG. 1]
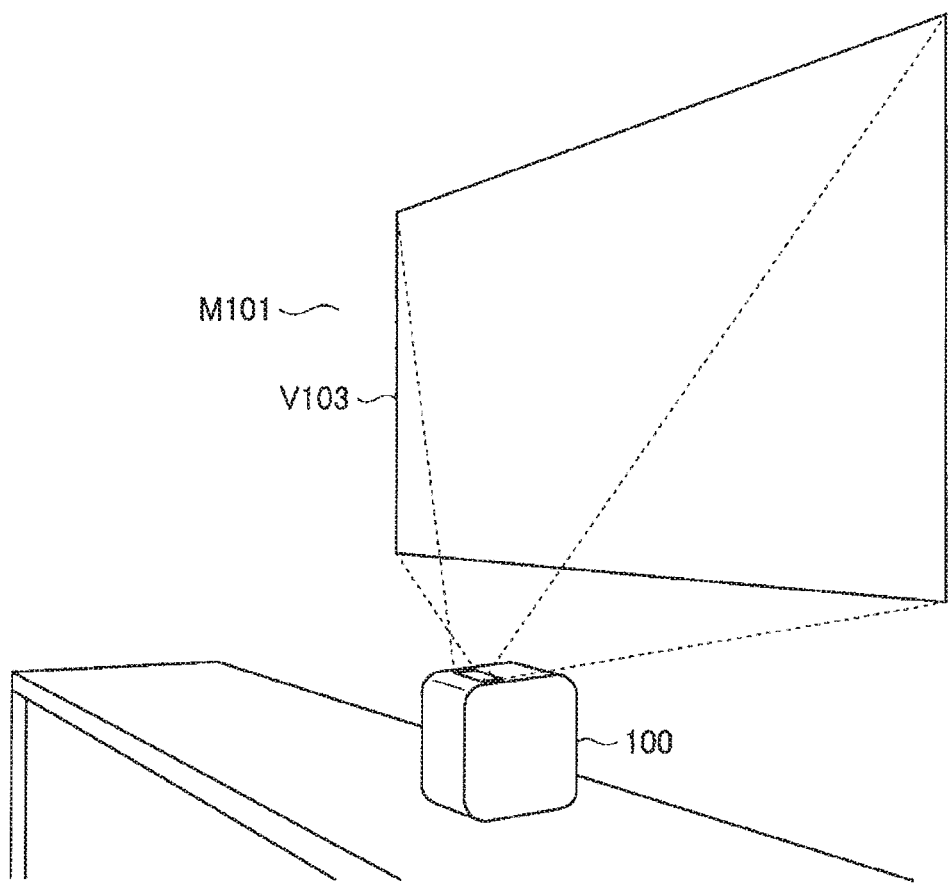

[FIG. 2]
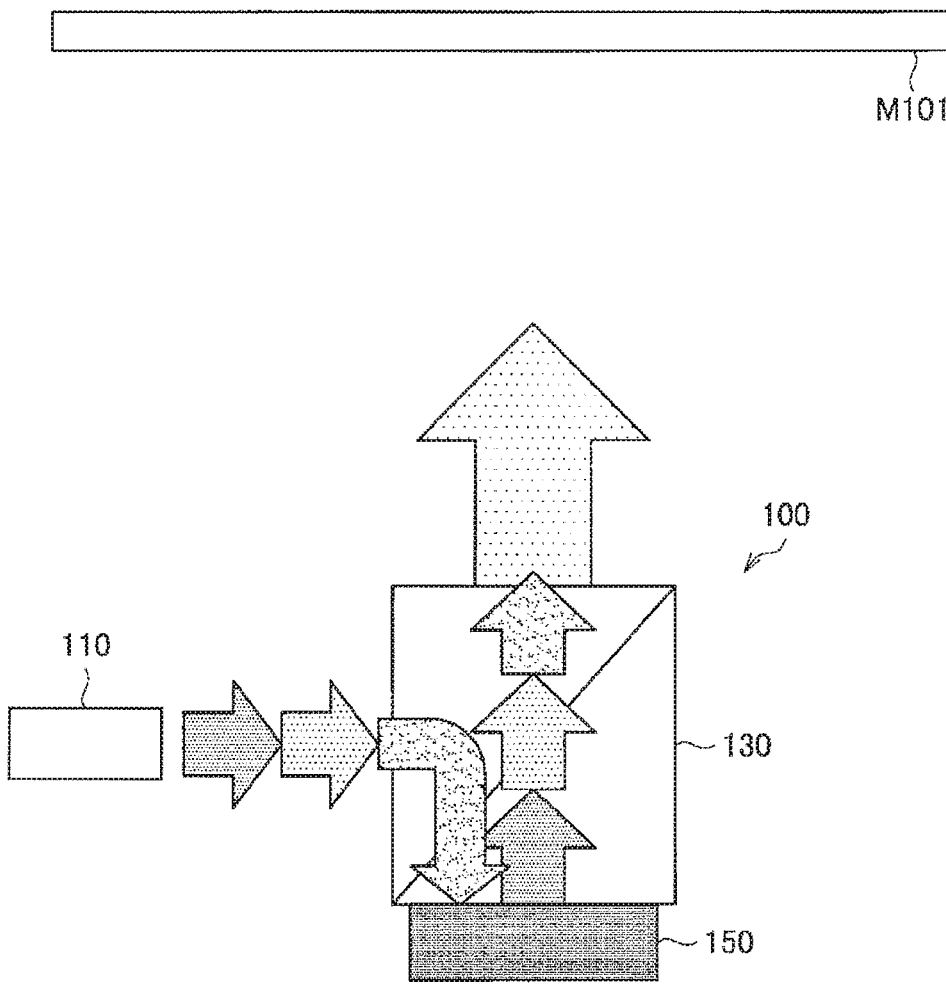

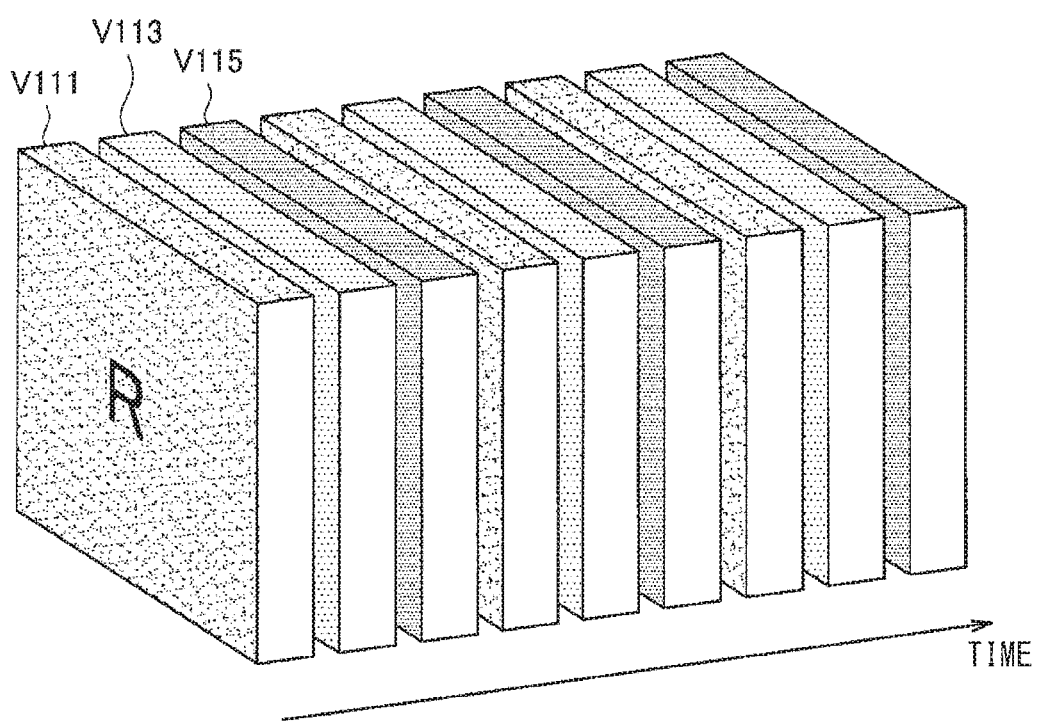
[FIG. 3]

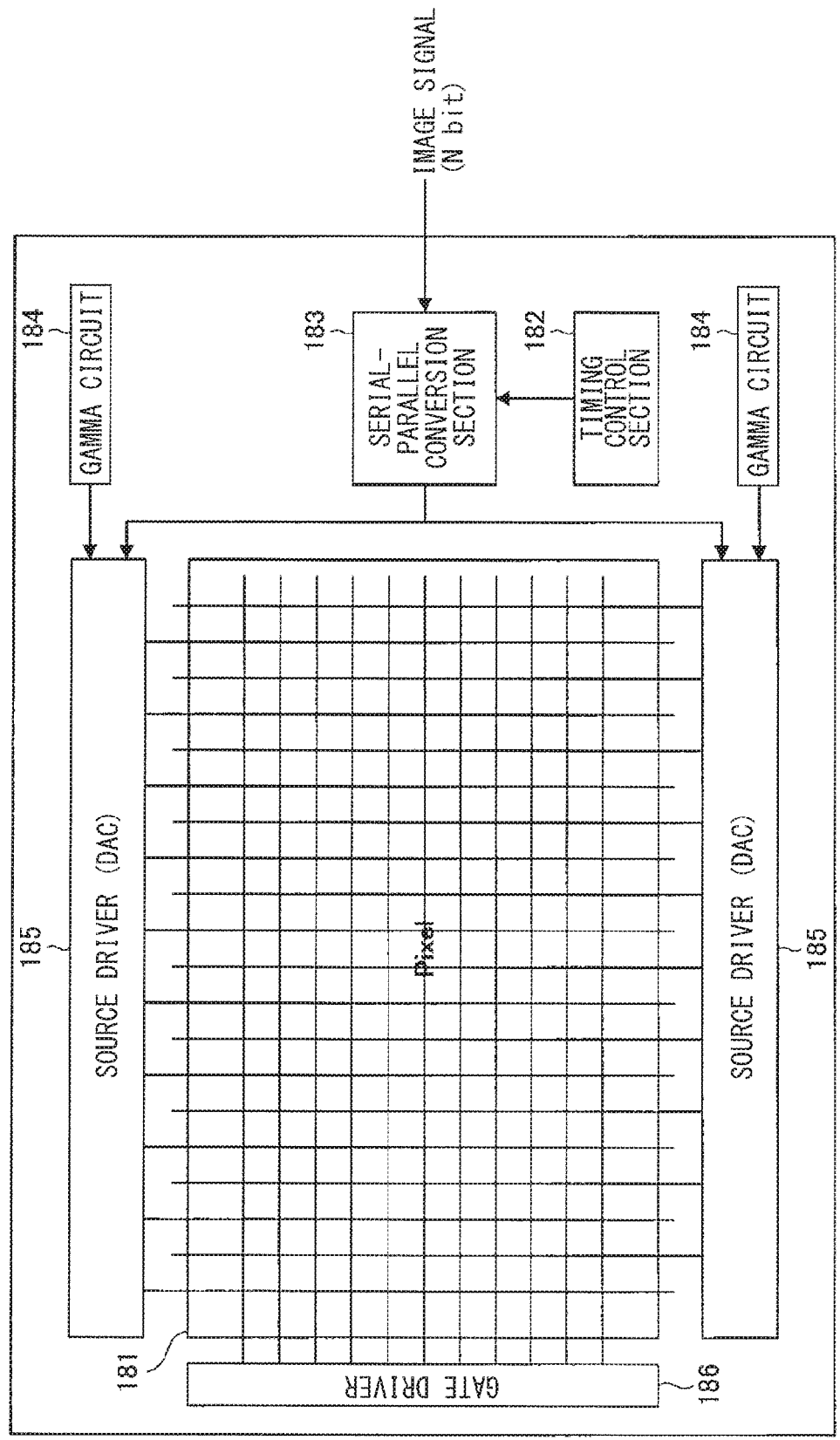
[FIG. 4]

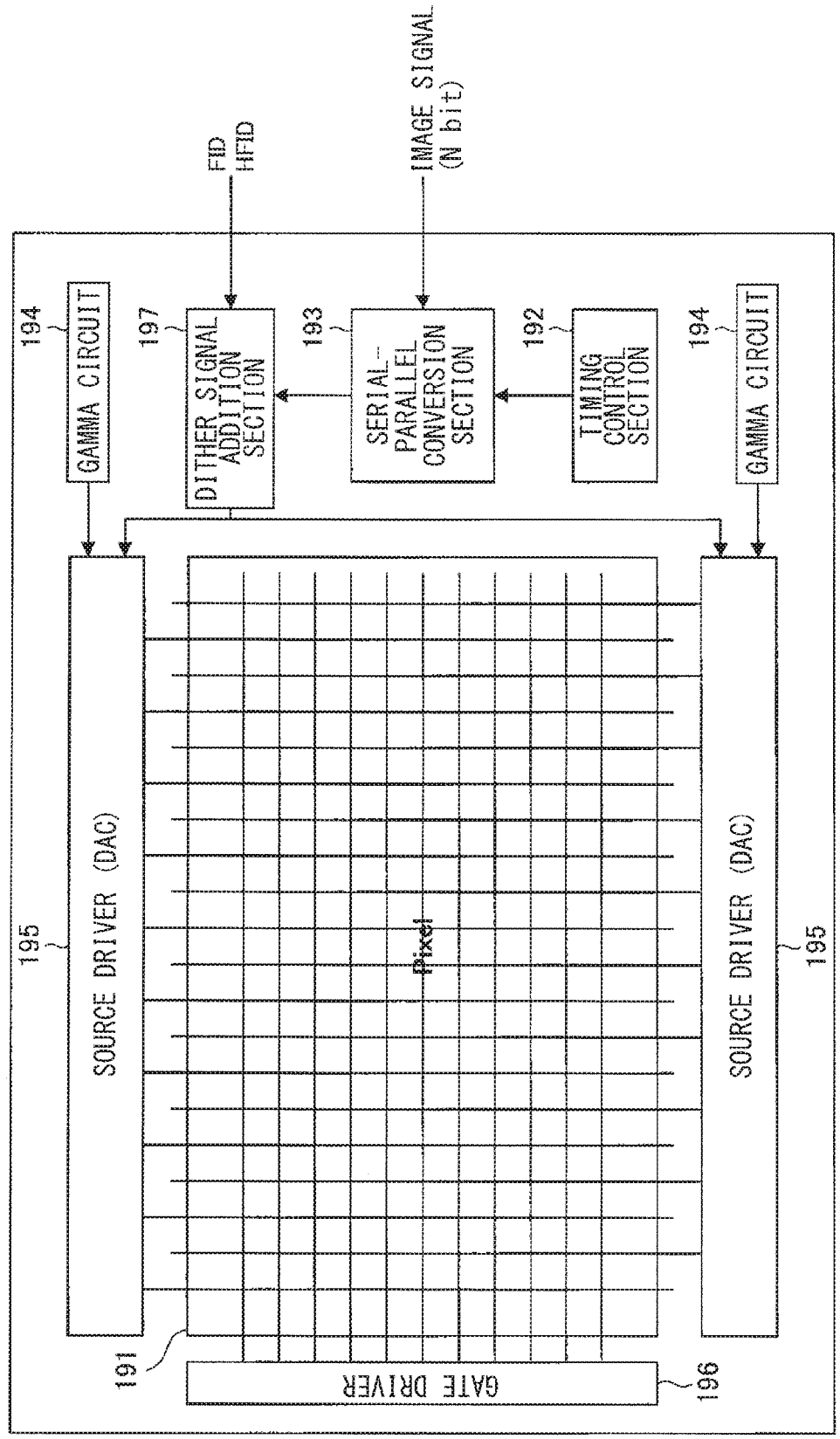
[FIG. 5]

[FIG. 6]
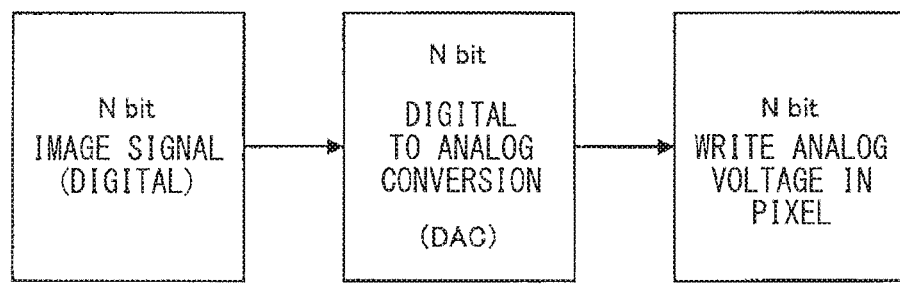

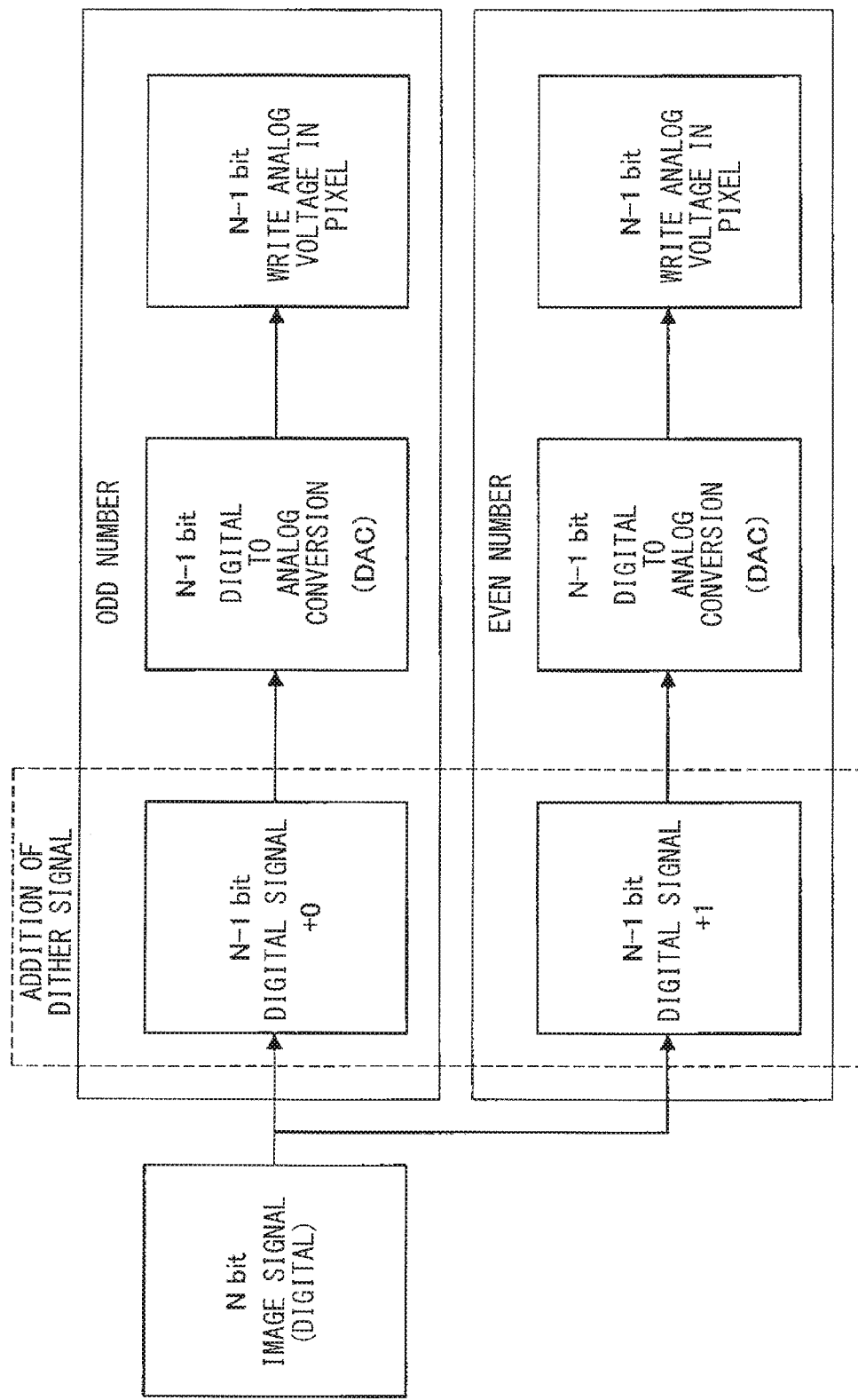
[FIG. 7]

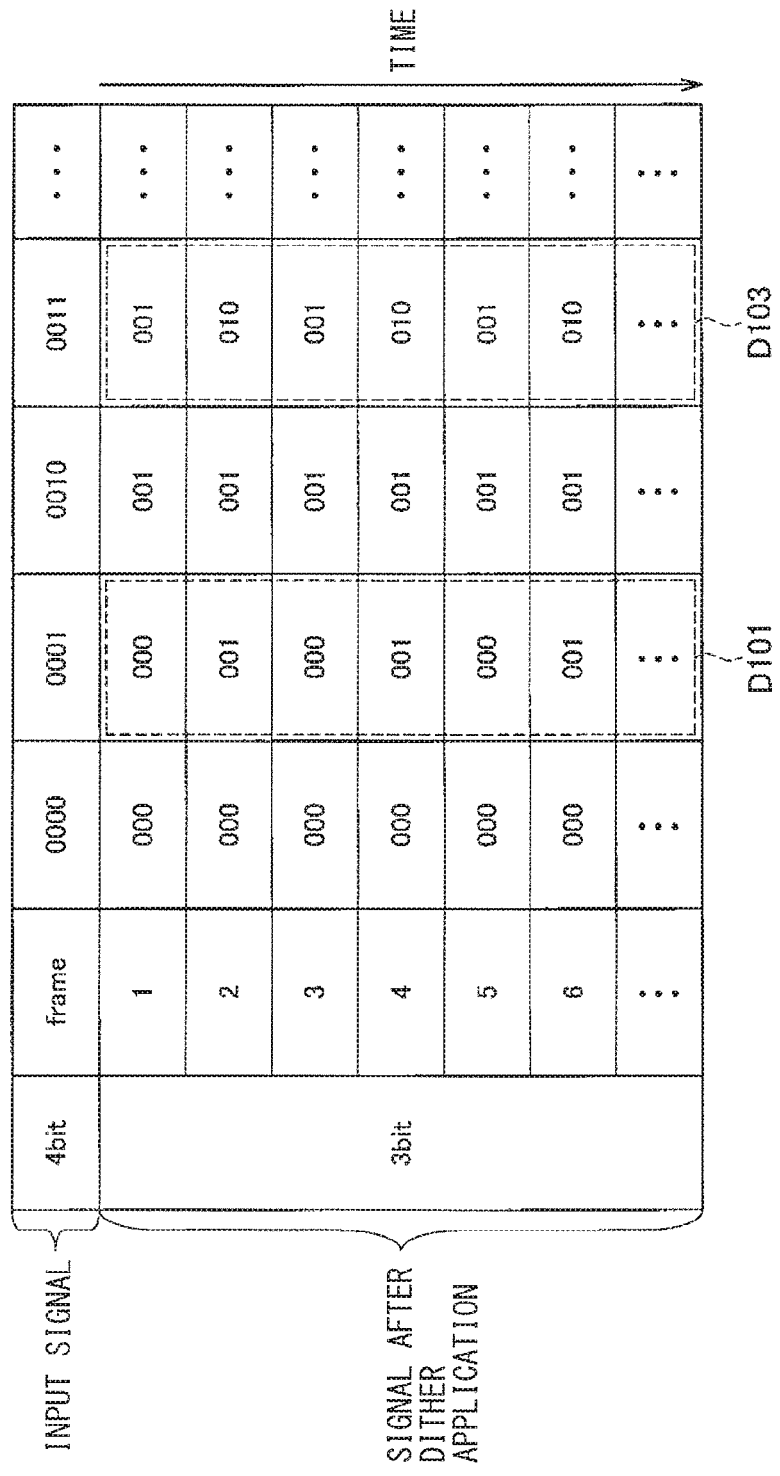
[FIG. 8]

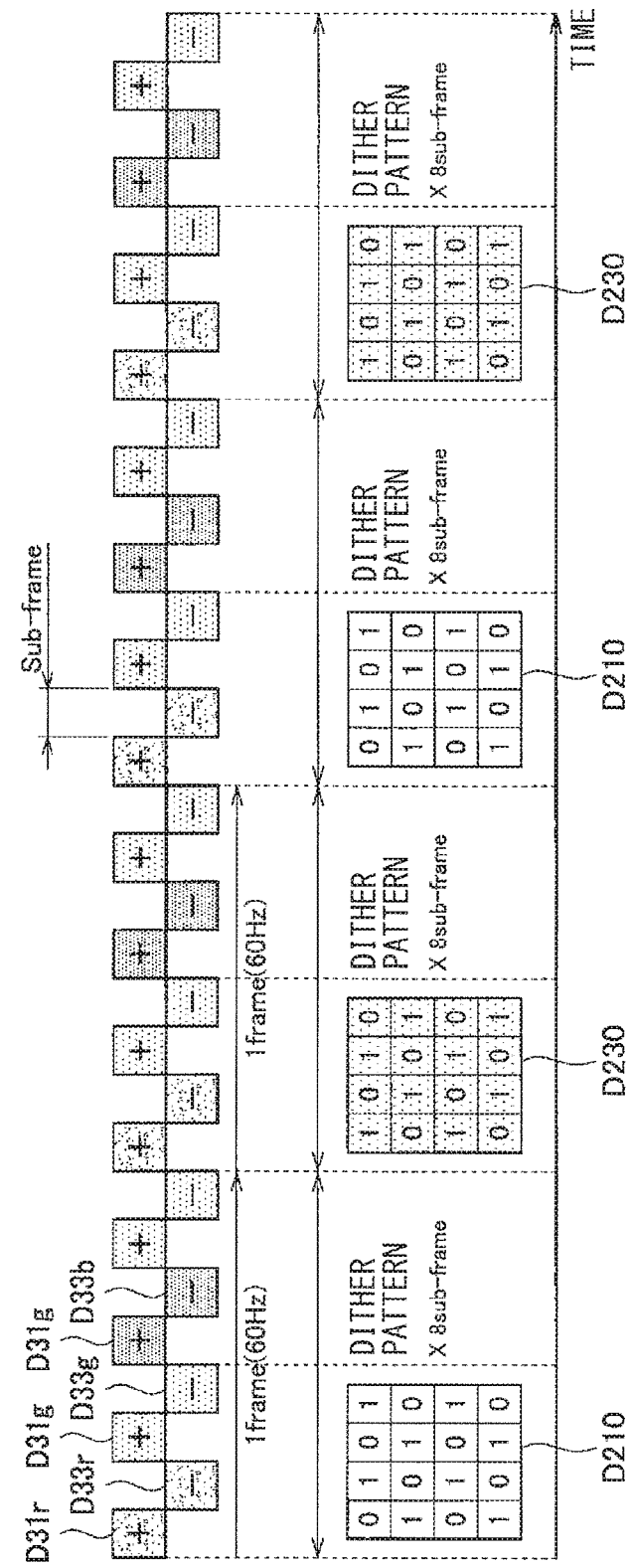
[FIG. 9]

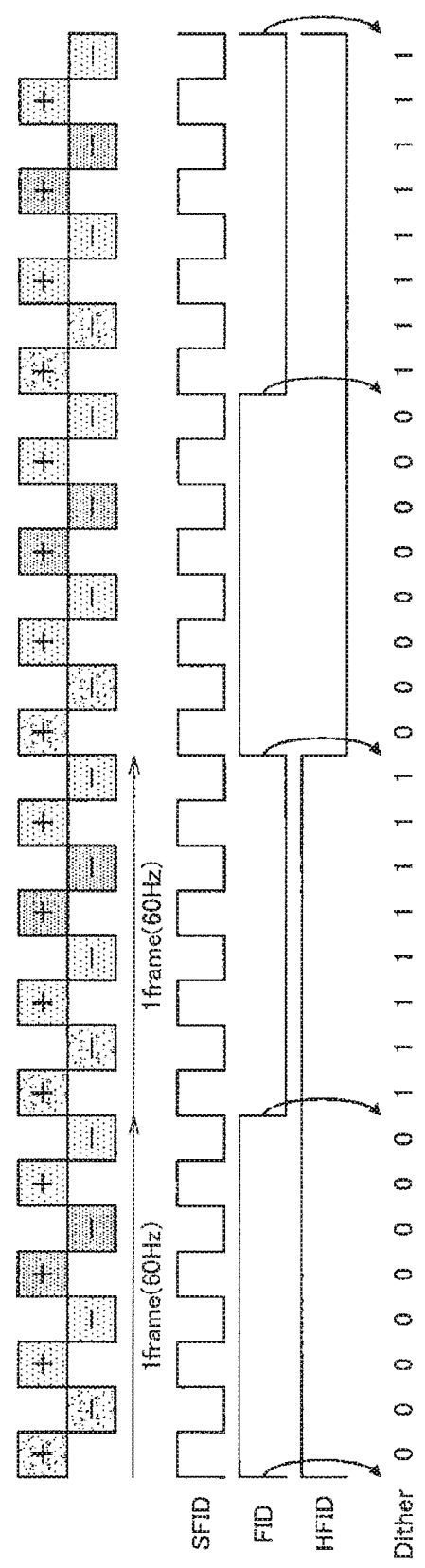
[FIG. 10]

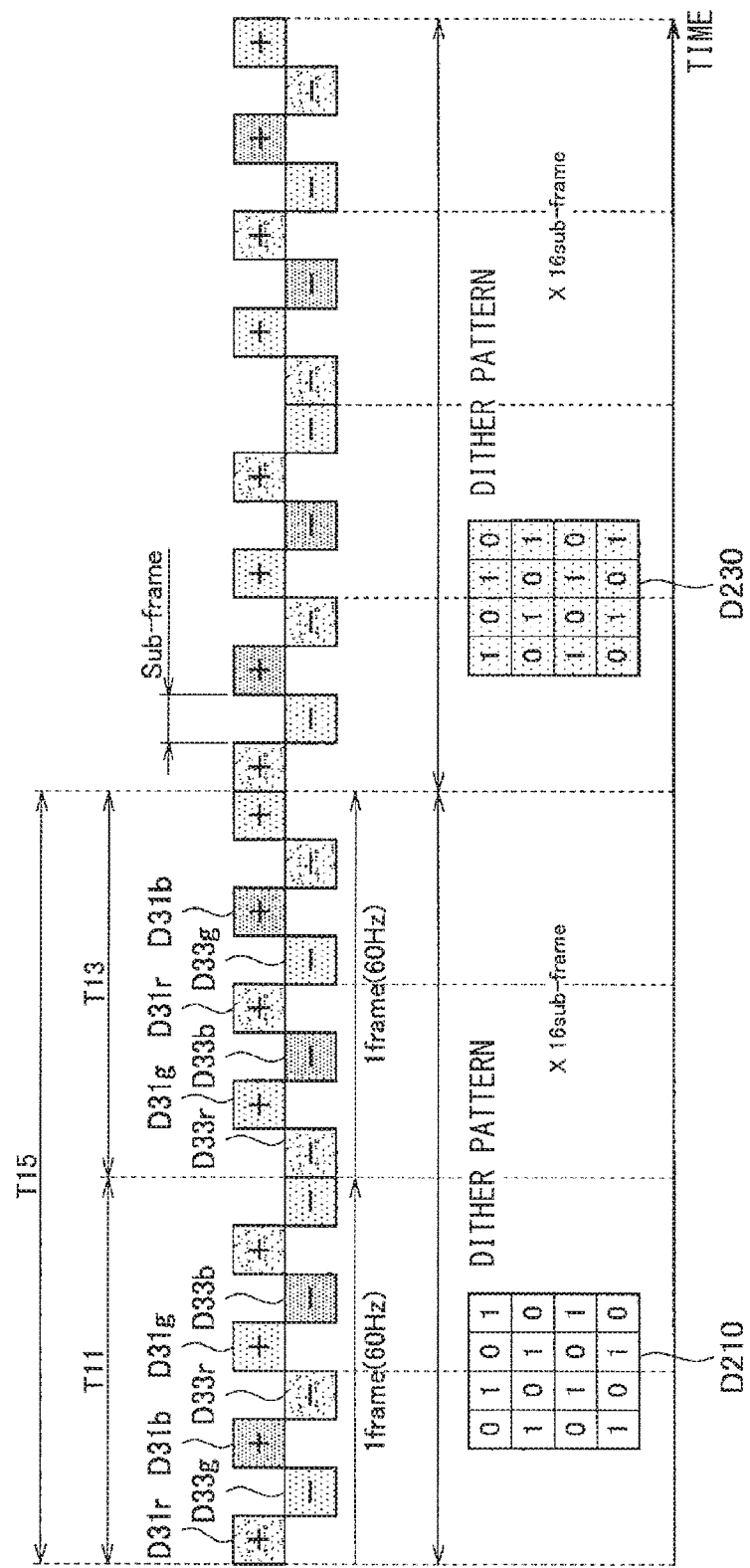
[FIG. 11]

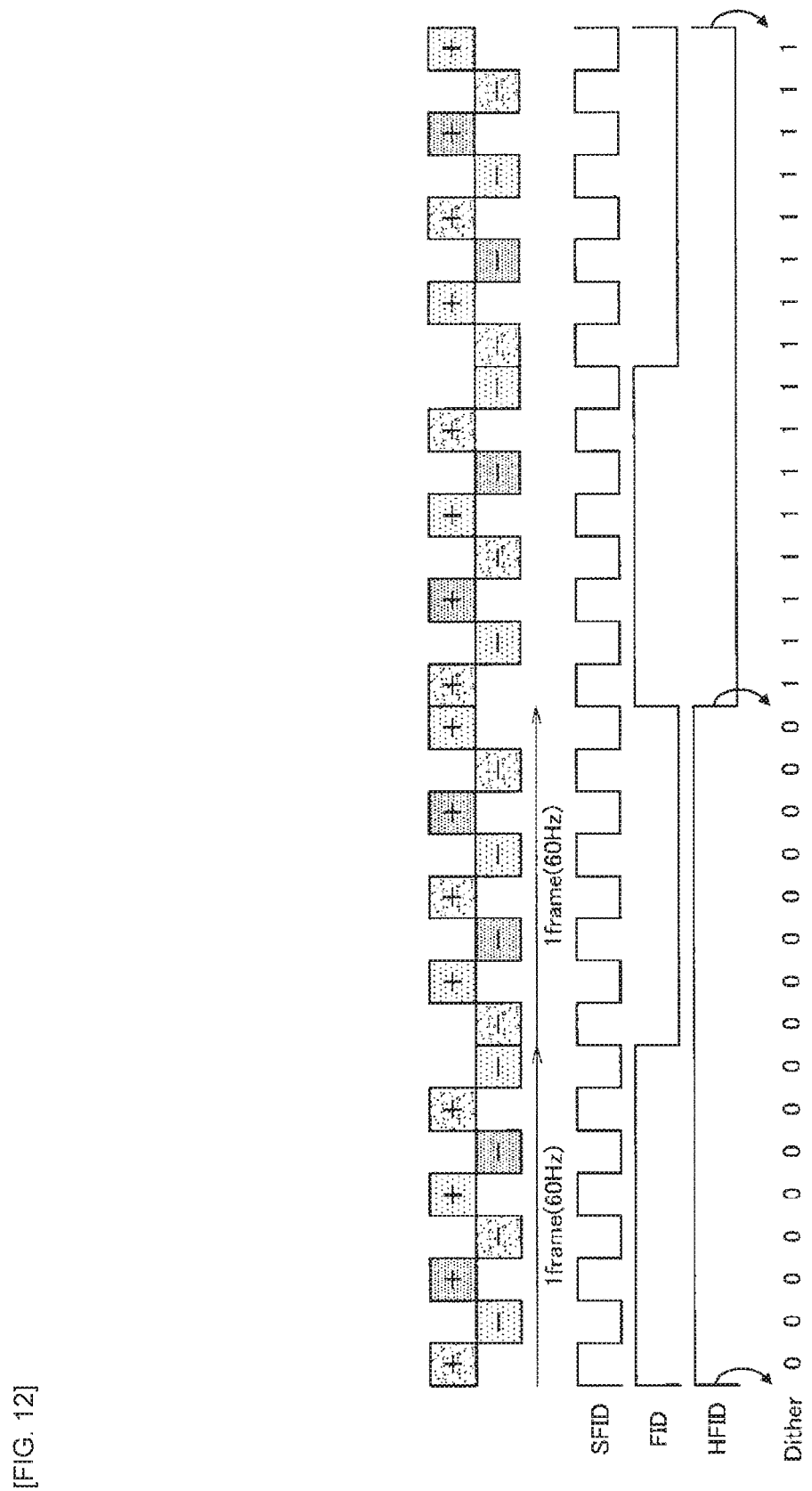
[FIG. 12]

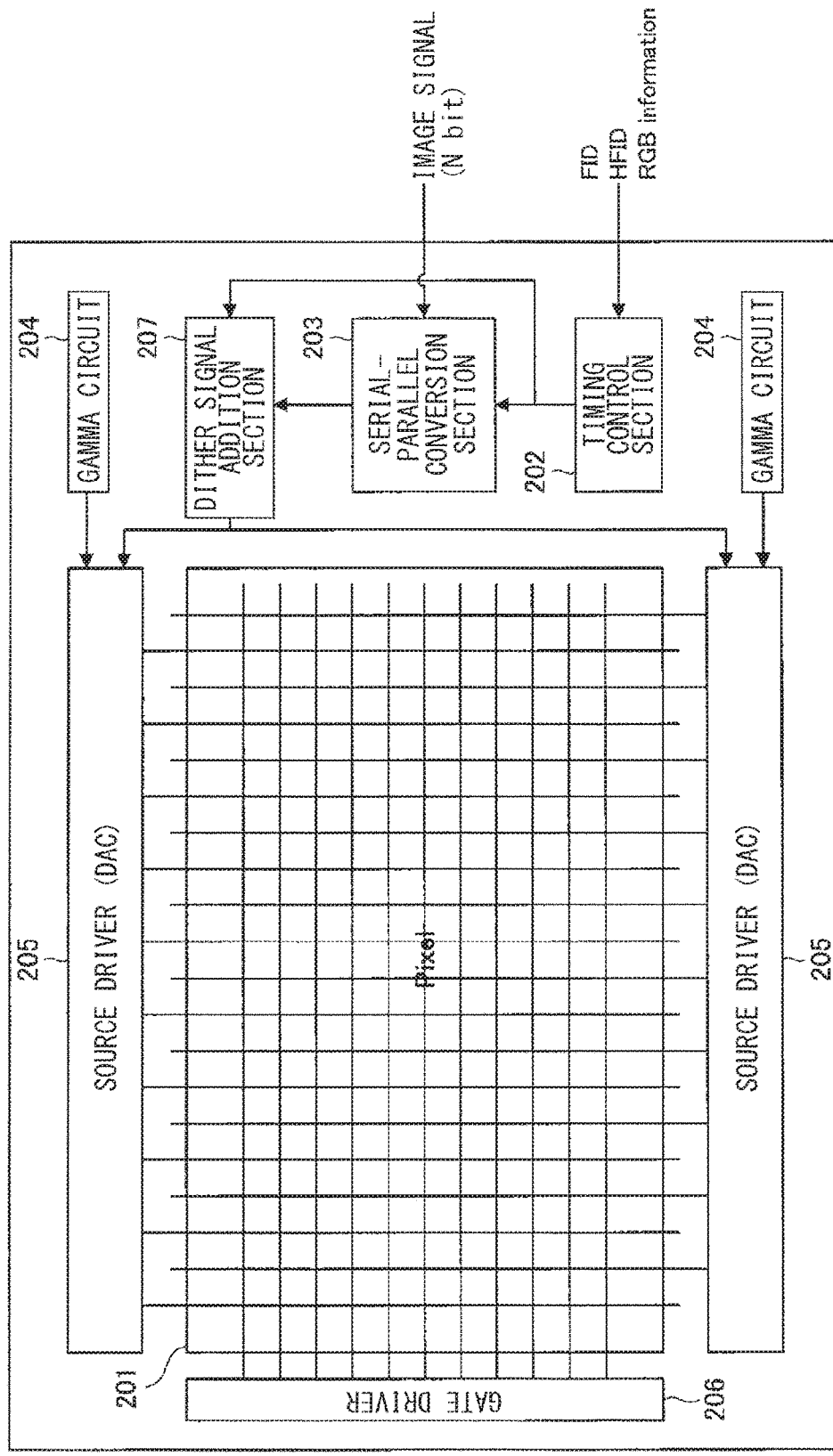
[FIG. 13]

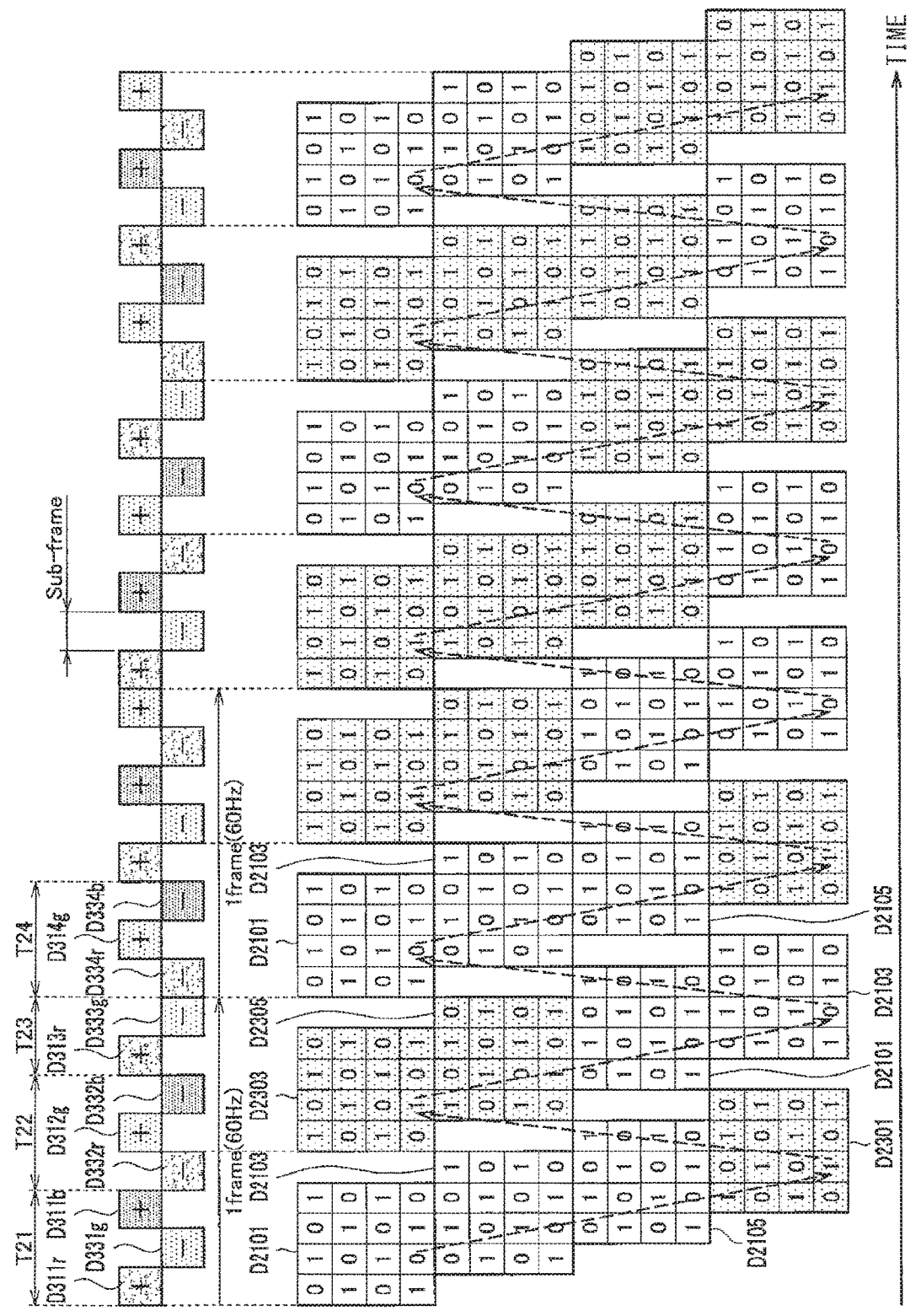

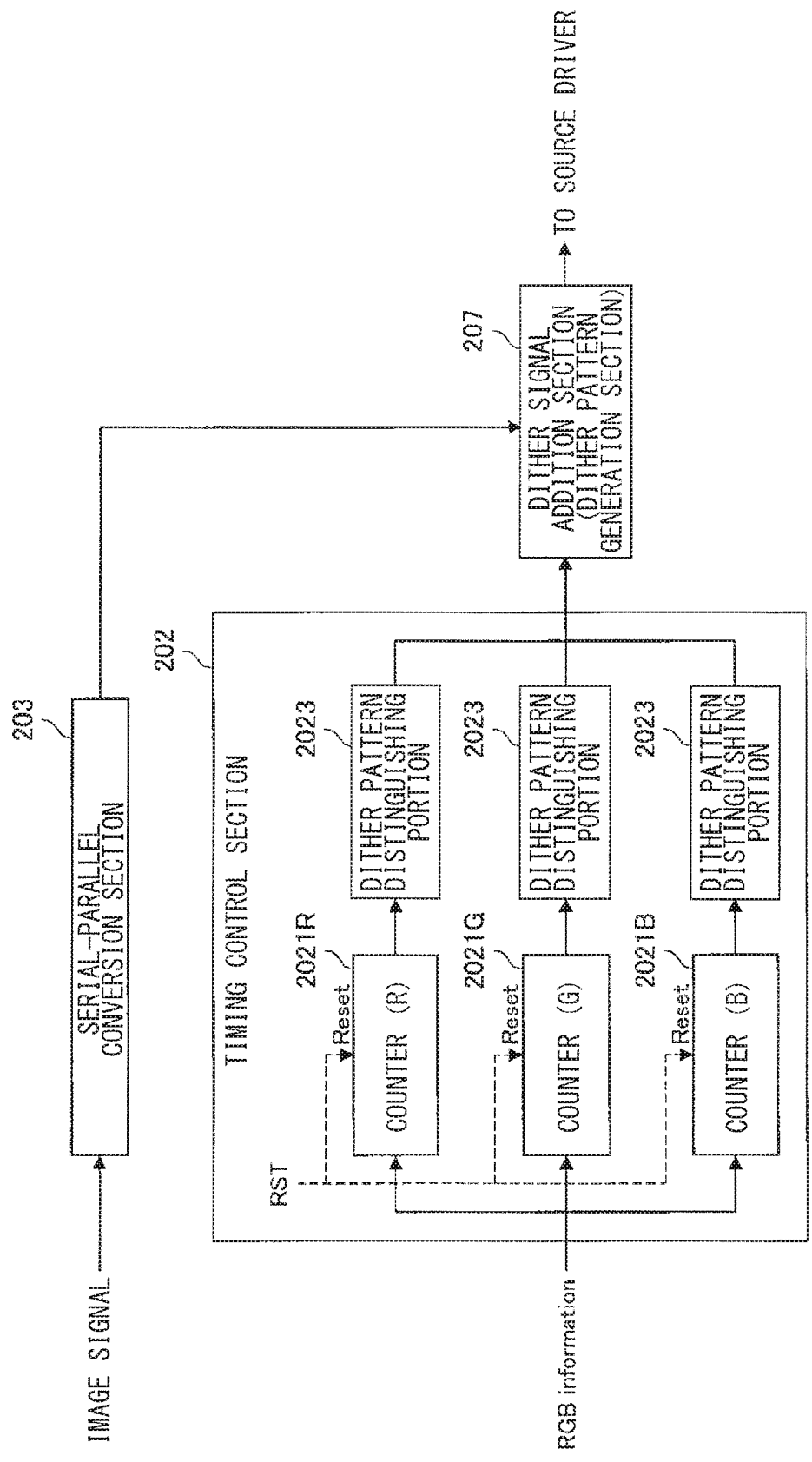
[FIG. 15]

[FIG. 16]
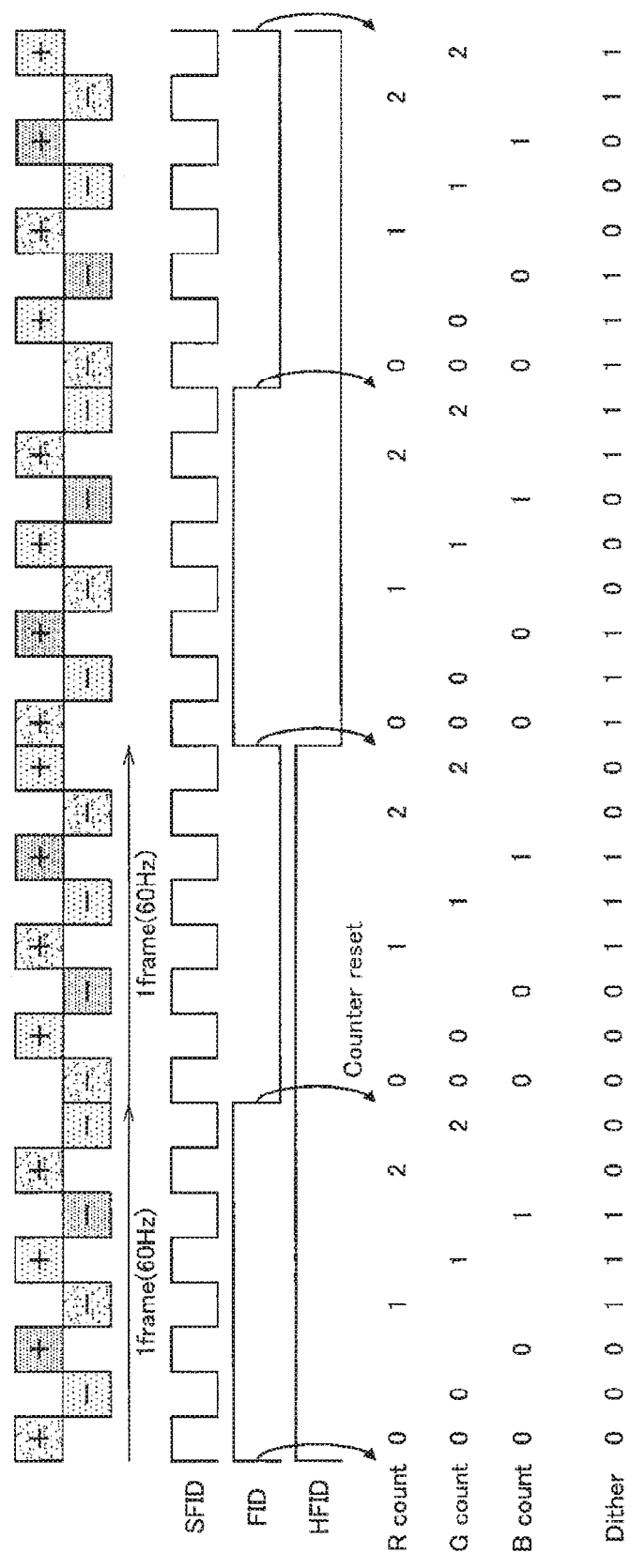

[FIG. 17]
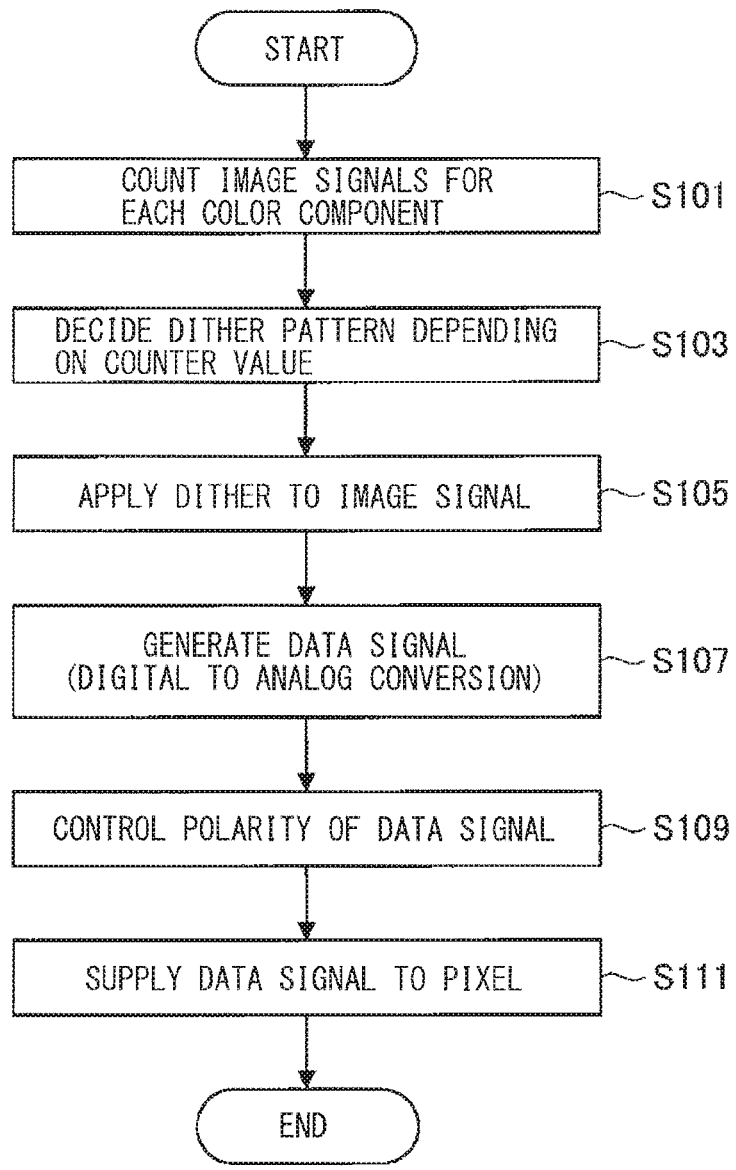

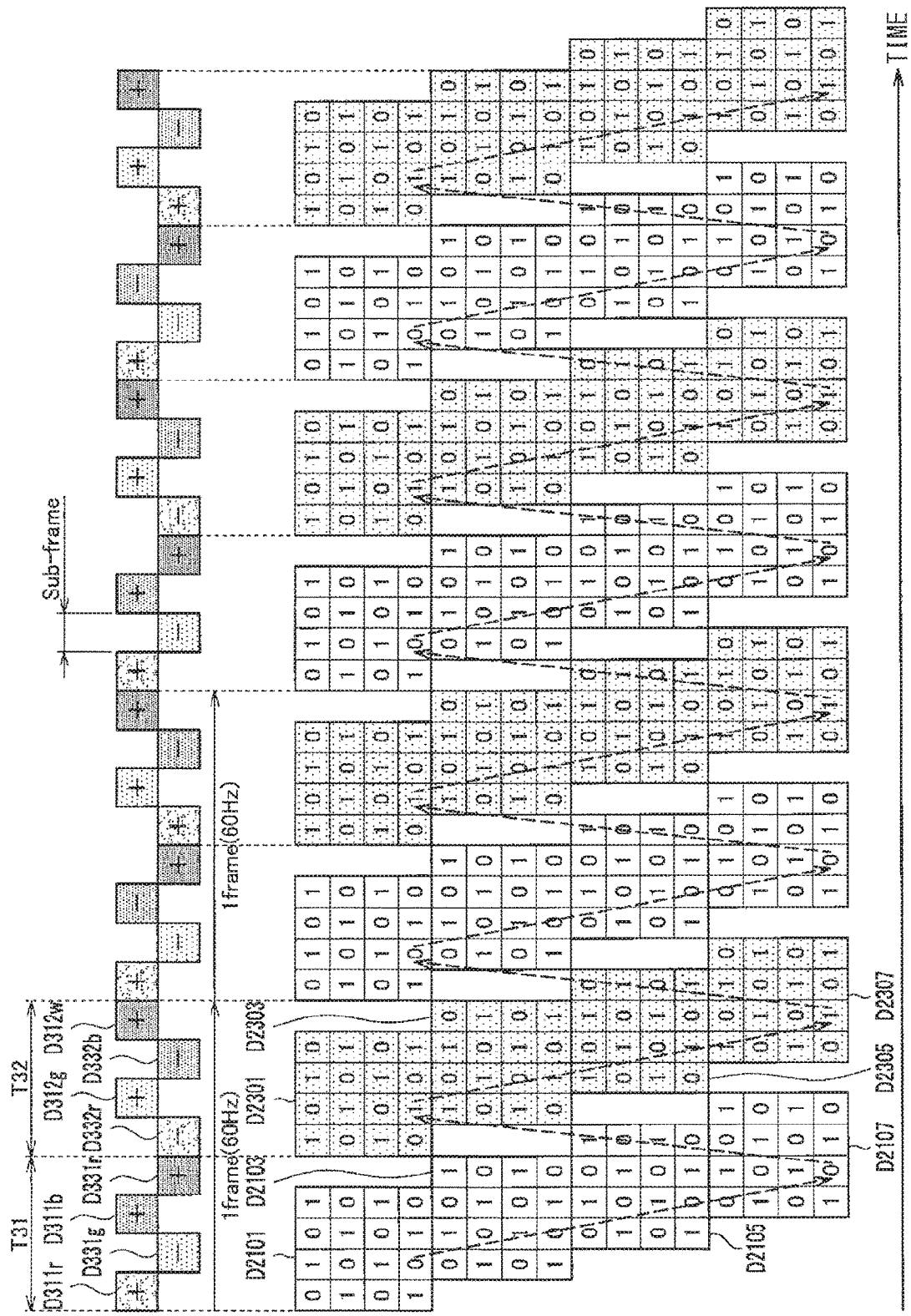
[FIG. 18]

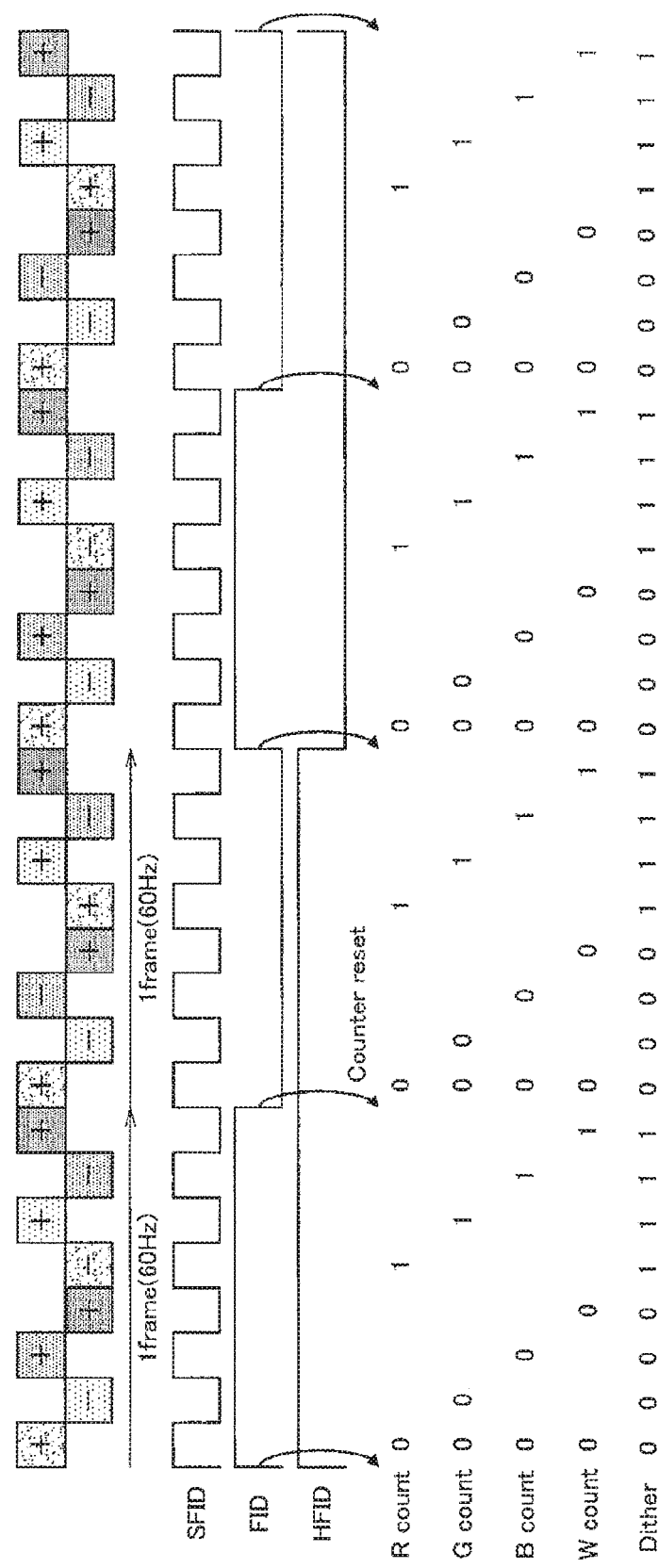

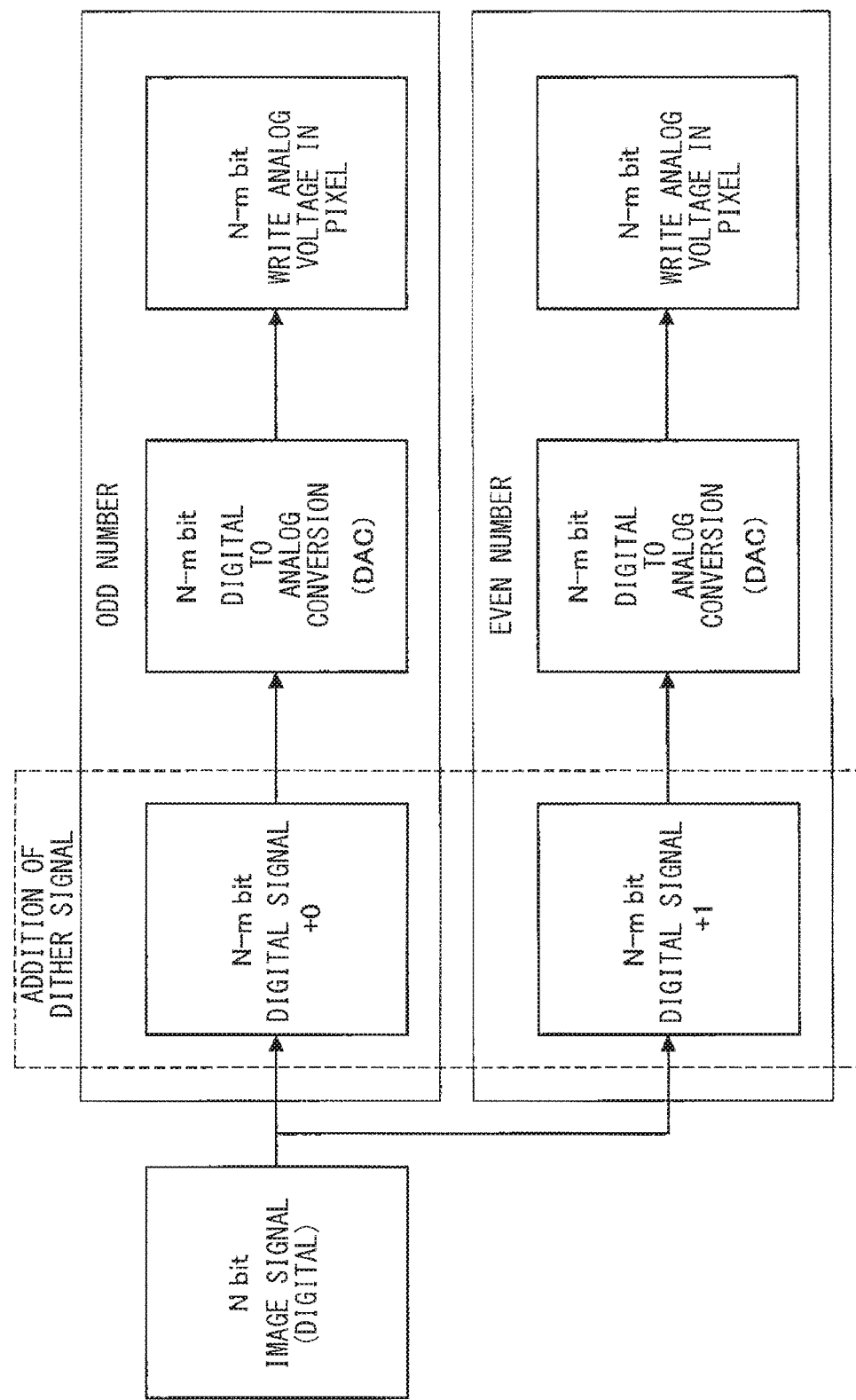
[FIG. 20]

[FIG. 21]

| INPUT SIGNAL | | SIGNAL AFTER DITHER APPLICATION | | | | | |
|---|---|---|---|---|---|---|---|
| 4bit | | 2bit | | | | | |
| frame | 1 | 2 | 3 | 4 | 5 | 6 | ... |
| 0000 | 00 | 00 | 00 | 00 | 00 | 00 | ... |
| 0001 | 00 | 01 | 00 | 00 | 00 | 01 | ... |
| 0010 | 00 | 01 | 01 | 00 | 00 | 01 | ... |
| 0011 | 00 | 01 | 01 | 01 | 00 | 01 | ... |
| 0100 | 01 | 01 | 01 | 01 | 01 | 01 | ... |
| ... | ... | ... | ... | ... | ... | ... | ... |

TIME →

D401

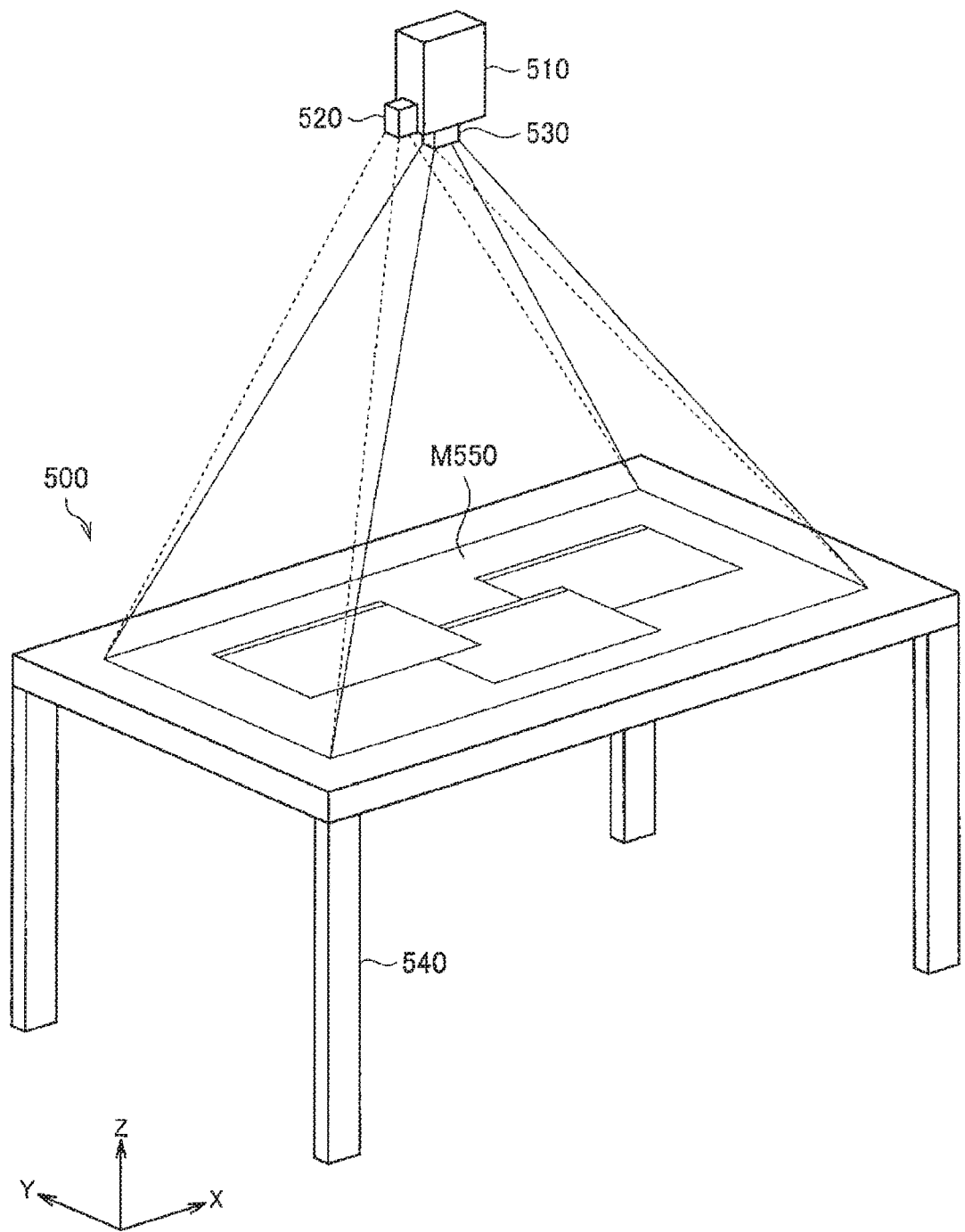
[FIG. 22]

DISPLAY APPARATUS AND DRIVING METHOD OF DISPLAY APPARATUS

CROSS REFERENCE TO RELATED APPLICATIONS

This application is a U.S. National Phase of International Patent Application No. PCT/JP2018/029340 filed on Aug. 6, 2018, which claims priority benefit of Japanese Patent Application No. JP 2017-178527 filed in the Japan Patent Office on Sep. 19, 2017. Each of the above-referenced applications is hereby incorporated herein by reference in its entirety.

TECHNICAL FIELD

The present disclosure relates to a display apparatus and a driving method of a display apparatus.

BACKGROUND ART

As a display apparatus that presents information in a visually recognizable manner, there is a projection-type display apparatus that presents information by projecting an image on a projection plane, like a so-called projector. For example, PTL 1 discloses an example of the projection-type display apparatus. Further, in recent years, various projection-type display apparatuses to each of which an LCOS (Liquid crystal on silicon, LCOS is a registered trademark) technology is applied have been proposed.

CITATION LIST

Patent Literature

PTL 1: Japanese Unexamined Patent Application Publication No. 2008-130522

SUMMARY OF THE INVENTION

Problems to be Solved by the Invention

Examples of the projection-type display apparatus to which the LCOS technology is applied include a display apparatus employing a single-panel system utilizing one sheet of LCOS and a display apparatus employing a three-panel system utilizing three sheets of LCOS. In the three-panel system, for example, images of different colors (e.g., RGB) of the respective three sheets of LCOS are generated, and the images generated by the respective sheets of LCOS are combined by an optical system, such as a prism, to be presented. In contrast, in the single-panel system, images of a plurality of colors are presented by the one sheet of LCOS. For this reason, in the display apparatus employing the single-panel system, there is a case where a drive system called "color sequential drive" that sequentially displays each of images of a plurality of colors in time division is adopted.

Thus, the present disclosure proposes a technique that enables an image to be displayed in a more suitable manner, in a case where the color sequential drive is adopted.

Means for Solving the Problem

According to the present disclosure, there is provided a display apparatus including: an addition section that adds a dither signal to a digital image signal for each of a plurality of color components, the digital image signal being generated on a basis of each of the plurality of color components different from each other, and inputted in predetermined order for each sub-frame included in a frame; a conversion section that performs digital to analog conversion of converting the digital image signal to which the dither signal is added into an analog image signal; and a control section that controls a pattern of the dither signal, at each predetermined cycle including a plurality of the sub-frames, depending on the order in which the digital image signal for each of the color components is inputted, within the frame.

Further, according to the present disclosure, there is provided a display apparatus including: a signal processing section that controls a polarity of a data signal based on an image signal for each of a plurality of color components, the image signal being generated on a basis of each of the plurality of color components different from each other, and inputted in predetermined order for each sub-frame included in a frame, at predetermined cycle including a plurality of sub-frames; and a control section that controls operation of a pixel on a basis of the data signal having the controlled polarity.

Furthermore, according to the present disclosure, there is provided a driving method of a display apparatus, the driving method including: causing a computer to add a dither signal to a digital image signal for each of a plurality of color components, the digital image signal being generated on a basis of each of the plurality of color components different from each other, and inputted in predetermined order for each sub-frame included in a frame; causing the computer to perform digital to analog conversion of converting the digital image signal to which the dither signal is added into an analog image signal; and causing the computer to control a pattern of the dither signal, at each predetermined cycle including a plurality of the sub-frames, depending on the order in which the digital image signal for each of the color components is inputted, within the frame.

Still further, according to the present disclosure, there is provided a driving method of a display apparatus, the driving method including: causing a computer to control a polarity of a data signal based on an image signal for each of a plurality of color components, the image signal being generated on a basis of each of the plurality of color components different from each other, and inputted in predetermined order for each sub-frame included in a frame, at predetermined cycle including a plurality of sub-frames; and causing the computer to control operation of a pixel on a basis of the data signal having the controlled polarity.

Effects of the Invention

As described above, according to the present disclosure, there is provided a technique that enables an image to be displayed in a more suitable manner, in a case where color sequential drive is adopted.

It is to be noted that the effect described above is not necessarily limitative, and any of effects described in the present specification or other effect conceivable from the present specification may be produced together with the above-described effect or in place of the above-described effect.

BRIEF DESCRIPTION OF DRAWINGS

FIG. 1 is an explanatory diagram describing an example of a schematic configuration of a display apparatus according to one embodiment of the present disclosure.

FIG. 2 is an explanatory diagram describing an example of a schematic configuration of a projector employing a single-panel system utilizing LCOS.

FIG. 3 is an explanatory diagram describing an outline of color sequential drive.

FIG. 4 is an explanatory diagram describing an example of a configuration of a display apparatus according to a comparative example 1.

FIG. 5 is an explanatory diagram describing an example of a configuration of a display apparatus according to a comparative example 2.

FIG. 6 is an explanatory diagram describing an outline of an example of signal processing of a portion where a data signal is generated on the basis of an image signal.

FIG. 7 is an explanatory diagram describing an outline of another example of signal processing of a portion where a data signal is generated on the basis of an image signal.

FIG. 8 is an explanatory diagram describing an example of processing according to application of dither to an image signal.

FIG. 9 is an explanatory diagram describing an outline of an example of a driving method of a display apparatus according to the comparative example 2.

FIG. 10 is a timing waveform diagram illustrating the example of the driving method of the display apparatus according to the comparative example 2.

FIG. 11 is an explanatory diagram describing an outline of an example of a driving method of a display apparatus according to a first embodiment of the present disclosure.

FIG. 12 is a timing waveform diagram illustrating the example of the driving method of the display apparatus according to the same embodiment.

FIG. 13 is a block diagram illustrating an example of a functional configuration of a display apparatus according to a second embodiment of the present disclosure.

FIG. 14 is an explanatory diagram describing an outline of an example of a driving method of the display apparatus according to the same embodiment.

FIG. 15 is a block diagram illustrating an example of a functional configuration of the display apparatus according to the same embodiment.

FIG. 16 is a timing waveform diagram illustrating the example of the driving method of the display apparatus according to the same embodiment.

FIG. 17 is a flowchart illustrating an example of a flow of a series of steps in processing of the display apparatus according to the same embodiment.

FIG. 18 is an explanatory diagram describing an example of a driving method of a display apparatus according to a modification example 1 of the same embodiment.

FIG. 19 is a timing waveform diagram illustrating the example of the driving method of the display apparatus according to the modification example 1 of the same embodiment.

FIG. 20 is an explanatory diagram describing an outline of a display apparatus according to a modification example 2 of the same embodiment.

FIG. 21 is an explanatory diagram describing an example of processing according to application of dither to an image signal, in the display apparatus according to the modification example 2 of the same embodiment.

FIG. 22 is an explanatory diagram describing an application example of a display apparatus according to one embodiment of the present disclosure.

MODES FOR CARRYING OUT THE INVENTION

Some suitable embodiments of the present disclosure are described below in detail with reference to the drawings. It is to be noted that, in the present specification and drawings, components having substantially the same functions are denoted by the same reference numerals to avoid overlapping description.

It is to be noted that the description is given in the following order.
1. Introduction
　1.1. Schematic Configuration
　1.2. Configuration Example of Display Apparatus Adopting Analog Drive System
　1.3. Application of Dither to Image Signal
　1.4. Example of Driving Method of Display Apparatus
2. First Embodiment
　2.1. Outline
　2.2. Technical Feature
　2.3. Evaluation
3. Second Embodiment
　3.1. Outline
　3.2. Technical Feature
　3.3. Modification Examples
　3.4. Evaluation
4. Application Example
5. Conclusion

1. INTRODUCTION

1.1. Schematic Configuration

First, an example of a schematic configuration of a display apparatus according to one embodiment of the present disclosure is described. For example, FIG. 1 is an explanatory diagram describing the example of the schematic configuration of the display apparatus according to the one embodiment of the present disclosure.

As illustrated in FIG. 1, a display apparatus 100 according to the present embodiment is configured as a projection-type display apparatus like a so-called projector, and projects display information to be presented, for example, on a projection plane, such as a wall surface, etc., and thereby presents the display information to a user. For example, in the example illustrated in FIG. 1, the display apparatus 100 is configured as a so-called short focus projector, and presents display information to a user by projecting the display information on a wall surface indicated by a reference numeral M101.

Further, a configuration of a single-panel system utilizing one sheet of LCOS (Liquid crystal on silicon, LCOS is a registered trademark) is applied to the display apparatus 100 according to the present embodiment. An outline of a display apparatus utilizing LCOS is therefore described below. Known examples of the display apparatus utilizing LCOS include a three-panel system and the above-described single-panel system.

In design of the three-panel system, an LCOS chip is provided for each of a red component (an R component), a green component (a G component), and a blue component (a B component), separately. In other words, in the case of the three-panel system, images of the respective color components of RGB formed of the respective LCOS chips are optically combined through an optical system such as a prism, and an image after this combining is projected on a projection plane.

In contrast, in design of the single-panel system, it is necessary to form an image of each of the color components of RGB by one LCOS chip. For this reason, in the case of the single-panel system, for example, a drive system referred to as "color sequential drive" is applied. The color sequential drive is a system of sequentially displaying images of the respective color components of RGB in time division.

Here, an example of a schematic configuration of a projector employing the single-panel system utilizing LCOS is described with reference to FIG. 2, by focusing on, in particular, a case where the color sequential drive is applied. FIG. 2 is an explanatory diagram describing an example of the schematic configuration of the projector employing the single-panel system utilizing LCOS.

The display apparatus 100 configured as a projector employing the single-panel system utilizing LCOS includes, for example, a light source 110, an optical system 130, and a light modulation device 150.

The optical system 130 may include, for example, optical devices such as a prism and a projection optical system. The optical system 130 guides light outputted from the light source 110, to the light modulation device 150. Further, the optical system 130 projects the light guided to the light modulation device 150 and reflected by the light modulation device 150, to outside of the display apparatus 100 (i.e., projects an image). It is to be noted that, a portion of the optical system 130 that projects the light reflected by the light modulation device 150 to the outside of the display apparatus 100 corresponds to an example of "projection section".

The light modulation device 150 may be configured as, for example, an LCOS chip. In this case, the light modulation device 150 is configured to sandwich liquid crystal between a silicon substrate and a transparent substrate. On side of the silicon substrate, a drive circuit that drives the liquid crystal and a pixel electrode are provided. The light guided to the light modulation device 150 through the optical system 130 passes through the transparent substrate and a liquid crystal layer and is then reflected by the pixel electrode. Further, the light reflected by the pixel electrode passes through the liquid crystal layer and the transparent substrate and is then outputted to the outside of the display apparatus 100 through the optical system 130. The light outputted in this way is projected on the projection plane M101 located in front of the display apparatus 100. In other words, an image is formed by reflection of the light from the light source 110 by the light modulation device 150, and the formed image is projected on the projection plane M101.

Here, the color sequential drive is described with reference to FIG. 2 and FIG. 3. FIG. 3 is an explanatory diagram describing an outline of the color sequential drive. For example, in FIG. 3, reference numerals V111, V113, and V115 indicate an image of the R component, an image of the G component, and an image of the B component, respectively. In other words, as illustrated in FIG. 3, in the color sequential drive, the images of the respective color components of RGB are sequentially displayed (projected) in time division. Specifically, as illustrated in FIG. 2, light of each of the color components of RGB is emitted from a light source in time division, and the liquid crystal layer of the light modulation device 150 is driven depending on light emission timing for the light of each of the color components. The images of the respective color components of RGB are thereby sequentially projected from the display apparatus 100 in time division. It is to be noted, in general, in a case where a frame rate is 50 to 60 Hz or more, individual images are recognized by a user as a series of consecutive images, without being separately recognized. In other words, the images of the respective color components of RGB sequentially projected in time division are perceived by the user as a composite image.

Further, the display apparatus 100 according to the present embodiment performs digital to analog conversion (DA conversion) of converting a digital image signal into an analog signal, and writes the analog signal in a pixel of the light modulation device 150, thereby displaying an image corresponding to the image signal. In other words, in the display apparatus 100 according to the present embodiment, gray-scale of an image to be displayed is decided depending on a voltage of the above-described analog signal to be written in each of the pixels. In other words, in the display apparatus 100 according to the present embodiment, the gray-scale of the image to be displayed is decided depending on intensity of light (i.e., light emission intensity) to be outputted to display this image. Such a drive system of a display apparatus is hereinafter also referred to as "analog drive system".

It is to be noted that besides the above-described "analog drive system", a drive system of a display apparatus referred to as "digital drive system" is known. In the digital drive system, gray-scale itself of light to be outputted to display an image is gray-scale in an either ON or OFF case, and a halftone between the gray-scale in the case of ON and the gray-scale in the case of OFF is expressed by a light-emission area and a light-emission time. As a specific example, in the digital drive system, the gray-scale of an image to be displayed is expressed by controlling a light-emission time that occupies a predetermined time period (e.g., a frame).

The example of the schematic configuration of the display apparatus according to the one embodiment of the present disclosure is described above with reference to FIG. 1 to FIG. 3.

1.2. Configuration Example of Display Apparatus Adopting Analog Drive System

Next, an example of a general configuration of a display apparatus adopting the analog drive system is described as a comparative example 1, for easy understanding of the display apparatus according to the present embodiment. For example, FIG. 4 is an explanatory diagram describing an example of a configuration of the display apparatus according to the comparative example 1. It is to be noted that FIG. 4 mainly illustrates a configuration of a portion corresponding to the light modulation device 150 in the example illustrated in FIG. 2.

As illustrated in FIG. 4, a display apparatus 180 includes a display panel 181, a timing control section 182, a serial-parallel conversion section 183, a gamma circuit 184, a source driver 185, and a gate driver 186.

The display panel 181 includes a plurality of pixels arranged in a matrix. Each of the pixels is supplied with a data signal (i.e., a drive signal for liquid crystal) corresponding to an image signal inputted to the display apparatus 180, from the source driver 185 described later, and is supplied with a driving pulse for timing control, from the gate driver 186 described later. At this time, a phase of light reflected by each of the pixels is modulated by controlling a state of the liquid crystal (i.e., driving of the liquid crystal) depending on a voltage of the data signal supplied from the source driver 185 to each of the pixels, and thereby gray-scale of an image to be displayed is controlled. Specifically, light outputted from a light source is reflected by the display panel 181, and projected to outside through a predetermined projection optical system. At this time, intensity of the light reflected by the display panel 181 is controlled depending on the data signal supplied to each of the pixels included in the display panel 181. Further, display timing for this image is controlled depending on the driving pulse supplied to each of the pixels.

It is to be noted that the display panel 181 is provided with a signal line (a data line) that couples the source driver 185 and each of the pixels, and a signal line (a scanning line) that couples the gate driver 186 and each of the pixels. In other words, the data signal from the source driver 185 is supplied to the corresponding pixel through the data line. Further, the driving pulse from the gate driver 186 is supplied to the corresponding pixel through the scanning line.

The timing control section 182 generates a timing signal (e.g., a clock pulse) serving as a reference for each of various kinds of operation, and supplies the generated timing signal to a desirable configuration within the display apparatus 180. This enables each of configurations within the display apparatus 180 to operate in synchronization with this timing signal, thereby making it possible to synchronize operation timings for the respective configurations with each other.

The serial-parallel conversion section 183 converts an image signal inputted as a serial signal into a parallel signal. At this time, the serial-parallel conversion section 183 executes, for example, processing according to serial-parallel conversion, in synchronization with the timing signal supplied from the timing control section 182. The serial-parallel conversion section 183 outputs the image signal (the parallel signal) after the above-described conversion to the source driver 185 located in a subsequent stage. As a result, for example, a signal in which the image signals corresponding to the respective plurality of pixels are arranged in serial is separated into image signals of the respective pixels, and the image signals of the respective pixels are inputted to the source driver 185 in parallel.

The source driver 185 generates an analog data signal by performing signal processing such as DA conversion on the digital image signal outputted from the serial-parallel conversion section 183, and supplies this data signal to each of the pixels included in the display panel 181 through the data line. A voltage depending on this data signal is thereby written in the corresponding pixel.

The gamma circuit 184 applies a reference voltage to a ladder resistance of a DA converter included in the inside of the source driver 185.

The gate driver 186 supplies a drive signal to each of the pixels included in the display panel 181 through the scanning line, and thereby controls drive timing for this pixel.

As the comparative example 1, the example of the general configuration of the display apparatus adopting the analog drive system is described above with reference to FIG. 4.

1.3. Application of Dither to Image Signal

Next, an outline of a technique of expressing a halftone by applying dither to an image signal is described as an example of a technique for expression of gray-scale in a display apparatus employing the analog drive system.

First, an example of a configuration of a display apparatus configured such that dither is applicable to an image signal is described as a comparative example 2. For example, FIG. 5 is an explanatory diagram describing an example of a configuration of the display apparatus according to the comparative example 2, and illustrates an example in a case where the display apparatus 180 illustrated in FIG. 4 is configured such that dither is applicable to an image signal. It is to be noted that FIG. 5 mainly illustrates a configuration of a portion corresponding to the light modulation device 150 in the example illustrated in FIG. 2.

As illustrated in FIG. 5, a display apparatus 190 according to the comparative example 2 includes a display panel 191, a timing control section 192, a serial-parallel changing section 193, a gamma circuit 194, a source driver 195, a gate driver 196, and a dither signal addition section 197. It is to be noted that the display panel 191, the timing control section 192, the serial-parallel changing section 193, the gamma circuit 194, the source driver 195, and the gate driver 196 correspond to the display panel 181, the timing control section 182, the serial-parallel conversion section 183, the gamma circuit 184, the source driver 185, and the gate driver 186 in the example illustrated in FIG. 4, respectively. In other words, the display apparatus 190 according to the comparative example 2 is different from the display apparatus 180 according to the comparative example 1 illustrated in FIG. 4, in that the dither signal addition section 197 is included. Thus, a configuration of the display apparatus 190 is described by focusing on a portion different from the display apparatus 180, and detailed description of other configurations is omitted.

The dither signal addition section 197 adds a dither signal to an image signal outputted from the serial-parallel changing section 193. At this time, the dither signal addition section 197 may add a dither signal depending on a predetermined dither pattern, to an image signal for each of pixels. Further, the dither signal addition section 197 may selectively switch a pattern of applying a dither signal to an image signal (i.e., a dither pattern), depending on an inputted signal (e.g., FID, HFID, etc., described later). Subsequently, the dither signal addition section 197 outputs the image signal (a digital signal) to which the dither signal is added, to the source driver 185 located in a subsequent stage.

Here, an outline of a flow of signal processing in a case where dither is applied to an image signal, and workings and effects to be produced by this application of the dither are described. First, an example of a flow of signal processing in a case where dither is not applied to an image signal is described with reference to FIG. 6, referring to a case where the display apparatus 190 according to the comparative example 1 described with reference to FIG. 4 as an example, by focusing on, in particular, a portion where a data signal is generated on the basis of an inputted image signal. FIG. 6 is an explanatory diagram describing an outline of an example of signal processing of a portion where a data signal is generated on the basis of an image signal, and illustrates an example of a flow of signal processing in the display apparatus according to the comparative example 1.

As illustrated in FIG. 6, an N-bit digital image signal is converted into an analog image signal by being subjected to digital to analog conversion by a DA conversion section, and a data signal based on this image signal is supplied to each of the pixels. In other words, an analog voltage depending on this data signal is written in this pixel. At this time, various kinds of processing (e.g., digital to analog conversion) are performed on the inputted digital image signal by using the same resolution as that of the number of bits of this image signal, and gray-scale indicated by this image signal is thereby faithfully reproduced. In other words, N-bit digital to analog conversion is performed on the N-bit digital image signal, thereby making it possible to faithfully reproduce the gray-scale indicated by this image signal.

Meanwhile, as the number of bits of processing to be performed on an image signal is larger, a circuit scale of a configuration that executes this processing tends to be greater. For example, in a case where the DA conversion section is focused on, as the number of bits of the digital to analog conversion is larger, the number of wiring lines tends to increase. For example, there is a case where the number of wiring lines more than doubles for each increment of 1 bit.

In contrast, providing a configuration of applying dither to an image signal makes it possible to reduce the number of bits of processing to be performed on this image signal, as in the digital to analog conversion by the DA conversion section. For example, FIG. 7 is an explanatory diagram describing an outline of another example of signal processing of a portion where a data signal is generated on the basis of an image signal, and illustrates an example of a flow of signal processing in the display apparatus 190 according to the comparative example 2 (i.e., an example in a case where dither is applied to an image signal).

As illustrated in FIG. 7, in the display apparatus 190 according to a modification example 2, a dither signal is added to an inputted N-bit digital image signal, and digital to analog conversion is performed on the image signal to which this dither signal is added. It is to be noted that, in the example illustrated in FIG. 7, addition of the dither signal to the image signal is controlled for each frame. As a specific example, in the example illustrated in FIG. 7, a dither signal is not added to an image signal in the case of an odd-numbered frame, and a dither signal is added to an image signal in the case of an even-numbered frame.

Further, in the example illustrated in FIG. 7, a resolution (i.e., the number of bits) of each of the processing according to the addition of dither and the processing according to the digital to analog conversion that are performed on the inputted image signal is set to a number smaller than that of the number of bits of this image signal by 1 bit. It is to be noted that, in general, in a case where N−1 bit digital to analog conversion is performed on an N-bit digital signal, information indicating a halftone not allowed to be expressed by using the number of bits of processing according to this conversion is lost. In contrast, as illustrated in FIG. 7, applying dither to an image signal makes it possible to express the above-described halftone, even in a case where the number of bits of the digital to analog conversion to be performed on an image signal is smaller than the number of bits of this image signal.

For example, FIG. 8 is an explanatory diagram describing an example of processing according to application of dither to an image signal, and schematically illustrates an example of a relationship between an inputted image signal and a signal after application of dither. It is to be noted that FIG. 8 illustrates an example in a case where the number of bits of an input signal is 4 and the number of bits of a signal after dither application is 3. Further, for the signal after dither application, a bit value is illustrated for each frame in a time series.

As illustrated in FIG. 8, in a case where a 4-bit input signal is converted into a 3-bit signal, for example, information indicating a trailing 1 bit is lost. For this reason, in a case where the trailing bit of the 4-bit input signal is "0" (e.g., in the case of "0000", "0010"), reproduction is enabled even in a case where conversion into the 3-bit signal is performed, but in a case where the trailing bit of the 4-bit input signal is "1" (e.g., in the case of "0001", "0011"), reproduction is difficult by using the 3-bit signal. For this reason, in the example illustrated in FIG. 8, a halftone that is difficult to be expressed using 3 bits is reproduced by adding a dither signal to a signal after conversion into 3 bits, for each frame, depending on a bit value (i.e., gray-scale) of the 4-bit input signal.

Specifically, as indicated by a reference numeral D101, in a case where a bit value of an input signal is "0001", "+1" serving as a dither signal is applied to "000" that is a bit value of the signal after conversion into 3 bits, in an even-numbered frame. In other words, in a case where the bit value of the input signal is "0001", "000" or "001" is outputted for each frame in time division, as the signal after dither application. Accordingly, a user visually recognizes light of gray-scale corresponding to the bit value of "000" or light of gray-scale corresponding to the bit value of "001", for each frame in time division. This user thereby perceives the light as a halftone between "000" and "001" (i.e., light corresponding to the bit value of "0001").

Similarly, as indicated by a reference numeral D103, in a case where a bit value of an input signal is "0011", "010" or "011" is outputted for each frame in time division, as the signal after dither application.

Thus, a halftone that is difficult to be reproduced (e.g., "0001" and "0011" illustrated in FIG. 8) only with a bit value because of a reduction in the number of bits is allowed to be reproduced with a signal of a smaller number of bits than that of an input signal by applying dither. In other words, applying dither makes it possible to further reduce a circuit scale, thereby making it possible realize downsizing of the apparatus and a reduction in production cost.

1.4. Example of Driving Method of Display Apparatus

Here, an example of a driving method of a display apparatus in a case where dither is applied to an inputted image signal is described referring to an example of the display apparatus according to the comparative example 2 described with reference to FIG. 5 to FIG. 8.

For example, FIG. 9 is an explanatory diagram describing an outline of an example of a driving method of the display apparatus according to the comparative example 2. In the example illustrated in FIG. 9, timing is illustrated of supplying a pixel with a data signal (i.e., a drive signal for liquid crystal) corresponding to each of color components of RGB depending on an inputted image signal. For example, reference numerals D31r and D33r each schematically indicate a data signal corresponding to the R component. Further, reference numerals D31g and D33g each schematically indicate a data signal corresponding to the G component. Further, reference numerals D31b and D33b each schematically indicate a data signal corresponding to the B component.

Specifically, because deterioration of liquid crystal is accelerated by applying a direct-current voltage, alternating reverse drive (alternating voltage drive) is adopted that drives the liquid crystal by applying an alternating voltage. Further, in a case where the color sequential drive is performed in a display apparatus adopting liquid crystal (e.g., LCOS, etc.), control is performed to achieve DC balance of each of the color components within a predetermined time period (e.g., one frame). As a specific example, driving of the display apparatus is controlled so that the number of signals of + polarity (positive polarity) and the number of signals of − polarity (negative polarity) are substantially equal, and a time indicating + polarity and a time indicating − polarity are substantially equal, within the predetermined time period, for each of the color components.

It is to be noted that the order of colors illustrated in FIG. 9 is merely an example, and the order of colors is not necessarily limited if the above-described condition is satisfied. As a specific example, image signals corresponding to a color component varying from frame to frame may be sequentially inputted. In this case, data signals corresponding to this color component are sequentially supplied to each of the pixels, depending on the order of the image signals for each of the color components.

Further, in the example illustrated in FIG. 9, timing of control of applying dither to an inputted image signal is also illustrated. In the example illustrated in FIG. 9, a pixel to which dither is to be applied is switched among 4×4 pixels in each predetermined time period (e.g., for each frame). In FIG. 9, reference numerals D210 and D230 each schematically indicate a pattern (hereinafter also referred to as "dither pattern") indicating the presence or absence of application of dither to the 4×4 pixels. In other words, in the dither patterns D210 and D230, "1" is set for a pixel to which dither is to be applied, and "0" is set for a pixel to which dither is not to be applied, among the 4×4 pixels. Further, the presence or absence of application of dither to each of the pixels is reversed between the dither patterns D210 and D230.

Next, an example of control timing in a case where the display apparatus 190 according to the comparative example 2 described with reference to FIG. 5 is driven as in the example illustrated in FIG. 9 is described with reference to FIG. 10. FIG. 10 is a timing waveform diagram illustrating the example of the driving method of the display apparatus according to the comparative example 2.

In FIG. 10, SFID indicates a synchronization signal for control of timing of supplying a pixel with a data signal corresponding to each of the color components of RGB depending on an inputted image signal. In other words, in a case where SFID indicates a high level, a data signal of + polarity is supplied to the pixel, and in a case where SFID indicates a low level, a data signal of − polarity is supplied to the pixel.

Further, Dither indicates a dither pattern to be applied to an image signal. In other words, in a case where a value of Dither is "0", the dither pattern D210 illustrated in FIG. 9 is applied to the image signal. Furthermore, in a case where the value of Dither is "1", the dither pattern D230 illustrated in FIG. 9 is applied to the image signal.

Switching between the dither patterns is controlled, for example, on the basis of either a control signal FID or HFID. At this time, for example, in a case where this control signal indicates a high level, the value of Dither is set to "0", and the dither pattern D210 illustrated in FIG. 9 is applied. Further, in a case where this control signal indicates a low level, the value of Dither is set to "1", and the dither pattern D230 illustrated in FIG. 9 is applied. It is to be noted that, in the example illustrated in FIG. 10, FID is switched between the high level and the low level for each frame. Further, HFID is switched between the high level and the low level every two frames. In other words, in the example illustrated in FIG. 10, the dither pattern is switched on the basis of FID, and the dither pattern is switched for each frame.

The example of the driving method of the display apparatus in the case where dither is applied to the inputted image signal is described above with reference to FIG. 9 and FIG. 10, referring to the example case of the display apparatus according to the comparative example 2 described with reference to FIG. 5 to FIG. 8.

2. FIRST EMBODIMENT

2.1. Outline

Next, as a first embodiment of the present disclosure, there is described an example of a technique that enables control of achieving DC balance of each of color components in a more suitable manner, in a case where the color sequential drive is performed.

As described above, in a case where the color sequential drive is performed in the display apparatus adopting the liquid crystal, it is desirable to perform control to achieve the DC balance of each of the color components within the predetermined time period. As a specific example, in the example described with reference to FIG. 9 and FIG. 10, one frame includes 8 sub-frames, and the data signal is supplied to each of the pixels for each sub-frame. In other words, the polarity of the data signal is controlled for each sub-frame.

However, in the example illustrated in FIG. 9 and FIG. 10 where three colors of RGB are outputted is assumed and one frame includes 8 sub-frames, a time period in which a data signal is supplied is long for only one color (e.g., only the G component), as compared with other colors, due to limitation of the DC balance. Under such a situation, there is a case where an imbalance in brightness between images corresponding to the respective color components of RGB occurs, and this appears as, for example, improper white balance. Such an imbalance may become a limitation on product design. Further, if a display period for one color is longer than those of other colors in the color sequential drive, there is a case where a phenomenon referred to as color breakup in which an afterimage of this one color is visually recognized easily appears.

Thus, in the present embodiment, there is proposed an example of a technique that performs control to achieve DC balance of each of color components in a more suitable manner, thereby making it possible to suppress the color breakup phenomenon, in a case where the color sequential drive is performed.

2.2. Technical Feature

A technical feature of the display apparatus according to the present embodiment is described below. For example, FIG. 11 is an explanatory diagram describing an outline of an example of a driving method of a display apparatus according to the first embodiment of the present disclosure. FIG. 11 illustrates, as with the example illustrated in FIG. 9, timing of supplying a pixel with a data signal (i.e., a drive signal for liquid crystal) corresponding to each of color components of RGB depending on an inputted image signal. In FIG. 11, data signals provided with respective reference numerals D31*r*, D31*g*, D31*b*, D33*r*, D33*g*, and D33*b* correspond to the data signals provided with the respective similar reference numerals in FIG. 9.

The display apparatus according to the present embodiment reverses a polarity of a data signal in each predetermined time period including a plurality of sub-frames, and performs control so that the DC balance of each of the color components is achieved in a series of time periods including a time period before the polarity reverse and a time period after the polarity reverse.

For example, in the example illustrated in FIG. 11, the polarity of the data signal is reversed for each frame, and the control is performed so that the DC balance of each of the color components is achieved within two consecutive frames. Specifically, in a time period (a frame) indicated by a reference numeral T11, the control is performed so that the data signals are supplied in order of R, G, and B to each of the pixels for each sub-frame, starting from the data signal D31*r* of the R component having a positive polarity. Further, at this time, the alternating reverse drive is performed. In other words, the polarity of the data signal is reversed for each sub-frame. Further, in a time period T13 (a frame) that continues from the time period T11, the polarity of each of the data signals sequentially supplied in the time period T11 is reversed. Specifically, in the time period T13, the control is performed so that the data signals are supplied in order of R, G, and B to each of the pixels for each sub-frame, starting from the data signal D33r of the R component having a negative polarity. On the basis of such a configuration, in the example illustrated in FIG. 10, the control is performed so that the DC balance of each of the color components is achieved in a series of time periods T15 including the consecutive periods T11 and T13 (i.e., a time period for two frames). In other words, in the time period T15, the control is performed so that the number of signals of + polarity (positive polarity) and the number of signals of − polarity (negative polarity) are substantially equal, and a time indicating + polarity and a time indicating − polarity are substantially equal, for each of the color components.

Further, FIG. 12 is a timing waveform diagram illustrating an example of a driving method of the display apparatus according to the present embodiment, and illustrates an example of control timing in a case where the display apparatus is driven as in the example illustrated in FIG. 11. It is to be noted that, as illustrated in FIG. 11, in a case where the polarity of the data signal is reversed for each frame, it is sufficient that control of reversing polarity is executed on the basis of a drive signal switching between a high level and a low level for each frame, as with FID illustrated in FIG. 12, for example.

It is to be noted that, in a case where switching between dither patterns is performed frame by frame in the display apparatus according to the present embodiment as in the above-described display apparatus according to the comparative example 2, switching between the dither patterns is performed for each time period T15 illustrated in FIG. 11 (i.e., every two frames). In other words, in this case, for example, control of switching between the dither patterns is executed on the basis of a drive signal that switches between a high level and a low level every two frames, as with HFID illustrated in FIG. 12.

The technical feature of the display apparatus according to the present embodiment is described above with reference to FIG. 11 and FIG. 12.

2.3. Evaluation

As described above, the display apparatus according to the present embodiment controls, at each predetermined cycle including the plurality of sub-frames, the polarity of the data signal based on the image signal for each of the color components that is generated on the basis of each of the plurality of color components different from each other, and inputted in the predetermined order for each sub-frame. In other words, this display apparatus controls operation of a pixel on the basis of the above-described data signal having the controlled polarity (e.g., supplies the data signal having the controlled polarity to this pixel).

In the display apparatus according to the present embodiment, limitations such as the color order of the data signals sequentially supplied to each of the pixels within one frame, and the number of the data signals corresponding to the respective color components within one frame, are relaxed by the above-described control, as compared with the display apparatus according to each of the above-described comparative examples. In other words, in the display apparatus according to the present embodiment, it is possible to further relax limitations on product design, as compared with the display apparatus according to each of the above-described comparative examples.

Further, in the display apparatus according to the present embodiment, as illustrated in FIG. 11 and FIG. 12, it is possible to control the order of the data signals corresponding to the respective color components so that the identical colors are not successive. In other words, it is possible to assign the data signals corresponding to the color components different from each other to the respective sub-frames adjacent to each other. For this reason, in the display apparatus according to the present embodiment, it is possible to suppress appearance of the color breakup phenomenon as compared with the display apparatus according to each of the above-described comparative examples, thereby making it possible to output a higher-quality image.

It is to be noted that, in this description, the example case is described where dither is applied to the inputted image signal in the display apparatus according to the present embodiment as in the example described with reference to FIG. 5. Meanwhile, the technique according to the present embodiment is also applicable to a case where dither is not applied to an inputted image signal, as in the example described with reference to FIG. 4. In this case, it is sufficient that, among the above-described controls, a portion corresponding to the control to achieve the DC balance of each of the color components is applied by reversing the polarity of the data signal in each predetermined time period.

3. SECOND EMBODIMENT

3.1. Outline

Next, as a second embodiment of the present disclosure, there is described an example of a technique that enables control of applying dither to be realized in a more suitable manner, in a case where the color sequential drive is performed.

In the display apparatus according to the above-described first embodiment, the polarity of the data signal is reversed in each predetermined time period including the plurality of sub-frames, and performs the control to achieve the DC balance of each of the color components in the series of time periods including the time period before the polarity reverse and the time period after the polarity reverse. In the display apparatus according to the first embodiment, such control makes it possible to control the order of the data signals corresponding to the respective color components so that the identical colors are not successive and thus, it is possible suppress appearance of the color breakup phenomenon, thereby making it possible to output a higher-quality image.

Meanwhile, in the display apparatus according to the first embodiment illustrated in FIG. 11 and FIG. 12 where switching between the dither patterns is performed frame by frame, this switching between the dither patterns is performed every two frames. In other words, in this case, a cycle of repetition of the dither pattern comes every four frames, and this cycle of repetition is long as compared with that of the display apparatus according to the comparative example 2. To be more specific, in a case where one frame is 60 Hz, the cycle of repetition of the dither pattern corresponds to 15 Hz. In such a case, screen flicker (a phenomenon referred to as so-called flicker) easily appears due to switching between the dither patterns, as compared with the display apparatus according to the comparative example 2.

In view of such a situation, in the present embodiment, there is proposed a technique that enables control of applying dither to be realized in a more suitable manner, in a case where the color sequential drive is performed. Specifically, there is proposed an example of a technique that enables further suppression of appearance of flicker, even in a case where a driving method similar to that of the first embodiment is applied.

3.2. Technical Feature

A technical feature of the display apparatus according to the present embodiment is described below.
(Schematic Configuration)

First, an example of a functional configuration of a display apparatus according to the second embodiment of the present disclosure is described with reference to FIG. 13. FIG. 13 is a block diagram illustrating an example of the functional configuration of the display apparatus according to the present embodiment. It is to be noted that FIG. 13 mainly illustrates a configuration of a portion corresponding to the light modulation device 150 in the example illustrated in FIG. 2.

As illustrated in FIG. 13, a display apparatus 200 according to the present embodiment includes a display panel 201, a timing control section 202, a serial-parallel conversion section 203, a gamma circuit 204, a source driver 205, a gate driver 206, and a dither signal addition section 207. The display panel 201, the timing control section 202, the serial-parallel conversion section 203, the gamma circuit 204, the source driver 205, the gate driver 206, and the dither signal addition section 207 correspond to the display panel 191, the timing control section 192, the serial-parallel changing section 193, the gamma circuit 194, the source driver 195, the gate driver 196, and the dither signal addition section 197 in the example illustrated in FIG. 5, respectively. Further, the display apparatus 200 according to the present embodiment is different from the display apparatus 190 illustrated in FIG. 5, in terms of operation of each of the timing control section 202 and the dither signal addition section 207. Thus, the following description focuses on a portion different from the display apparatus 190, and detailed description of a portion substantially similar to that of the display apparatus 190 is omitted.

It is to be noted that the configuration illustrated in FIG. 13 is merely an example, and does not necessarily limit the configuration of the display apparatus according to the present embodiment. As a specific example, some of the configurations illustrated in FIG. 13 may be provided outside the display apparatus. Further, some of the configurations illustrated in FIG. 13 may be implemented by a combination of a plurality of circuits or a plurality of devices. Furthermore, in the example illustrated in FIG. 13, a portion according to control of DC balance in the source driver 205 corresponds to an example of "signal processing section". Still furthermore, a portion of the source driver 205 according to supply of a data signal to a pixel, etc., corresponds to an example of "control section" that controls operation of a pixel. Moreover, the dither signal addition section 207 corresponds to an example of "addition section", and a DA converter included in the source driver 205 corresponds to an example of "conversion section".
(Outline of Driving Method)

Next, an outline of a driving method of the display apparatus 200 is described, for easy understanding of characteristics of the display apparatus 200 according to the present embodiment. For example, FIG. 14 is an explanatory diagram describing an outline of an example of the driving method of the display apparatus according to the present embodiment. It is to be noted that, in the example illustrated in FIG. 14, an image signal for each of color components is inputted in order similar to that of the example illustrated in FIG. 11, and a data signal is generated on the basis of this image signal, as with the example illustrated in FIG. 11. In other words, in the example illustrated in FIG. 14, data signals indicated by respective reference numerals D311$r$, D331$g$, D311$b$, D332$r$, D312$g$, and D332$b$ correspond to the data signals D31$r$, D33$g$, D31$b$, D33$r$, D31$g$, and D33$b$ in the example illustrated in FIG. 11, respectively. Further, a data signal indicated by the reference numeral D313$r$ and a data signal indicated by a reference numeral D333$g$ indicate a data signal of + polarity corresponding to an R component and a data signal of − polarity corresponding to a G component, respectively. It is to be noted that the data signals D313$r$ and D333$g$ are sequentially supplied to each of the pixels, after the data signal D332$b$ is supplied to each of the pixels, within a frame. Further, a data signal indicated by a reference numeral D334$r$, a data signal indicated by a reference numeral D314$g$, and a data signal indicated by a reference numeral D334$b$ indicate a data signal of − polarity corresponding to the R component, a data signal of + polarity corresponding to the G component, and a data signal of − polarity corresponding to a B component, respectively that are sequentially inputted in a second frame.

On the basis of such a configuration, the display apparatus 200 according to the present embodiment controls a dither pattern to be applied to an mage signal at each predetermined cycle including a plurality of sub-frames, depending on order in which the image signal generated on the basis of each of a plurality of color components different from each other is inputted. For example, in the example illustrated in FIG. 14, the image signals corresponding to the respective R, G, and B components are inputted in this order to the display apparatus 200 successively. Using a time period (i.e., three sub-frames) including one image signal of each of the R component, the G component, and the B component as one cycle, the display apparatus 200 switches the dither pattern to be applied to this image signal at this cycle.

Specifically, at first, the image signals of the respective R, G, and B components, which become sources of generation of the data signals D311$r$, D331$g$, and D311$b$, are inputted in this order to the display apparatus 200 successively. Further, in the example illustrated in FIG. 14, dither depending on each of dither patterns D2101, D2103, and D2105 is applied to the image signal of each of the color components of RGB. It is to be noted that the dither patterns D2101, D2103, and D2105 each correspond to the dither pattern D210 in the example illustrated in each of FIG. 9 and FIG. 11. In other words, in a time period indicated by a reference numeral T21 for three sub-frames and including one image signal for each of the color components of RGB, a dither signal depending on the dither pattern D210 is added to this image signal.

Next, the image signals of the respective R, G, and B components, which become sources of generation of the data signals D332$r$, D312$g$, and D332$b$, are inputted in this order to the display apparatus 200 successively. At this time, the dither pattern of dither to be applied to the image signal of each of the color components of RGB is switched. Specifically, in the example illustrated in FIG. 14, dither depending on each of dither patterns D2301, D2303, and D2305 is applied to the image signal of each of the color components of RGB. It is to be noted that the dither patterns D2301, D2303, and D2305 each correspond to the dither pattern D230 in the example illustrated in each of FIG. 9 and FIG. 11. In other words, in a time period indicated by a reference numeral T22 for three sub-frames and including one image signal for each of the color components of RGB, the dither signal depending on the dither pattern D230 is added to this image signal.

Next, the image signals of the respective R and G components, which become sources of generation of the data signals D313r and D333g, are inputted in this order to the display apparatus 200 successively. At this time, the dither pattern of dither to be applied to the image signal of each of the color components of RGB is switched again. Specifically, in the example illustrated in FIG. 14, dither depending on each of the dither patterns D2301 and D2303 is applied to the image signal of each of the color components of R and G. In other words, in a time period indicated by a reference numeral T23, the dither signal depending on the dither pattern D210 is added to this image signal.

Further, the dither pattern of dither to be applied to the image signal may be reset in another cycle longer than the cycle at which this dither pattern is switched. For example, in the example illustrated in FIG. 14, the dither pattern is reset for each frame. Specifically, in the example illustrated in FIG. 14, the image signals of the respective R, G, and B components, which become sources of generation of the data signals D334r, D314g, and D334b, are inputted in this order to the display apparatus 200 successively, in the second frame. At this time, dither depending on each of the dither patterns D2101, D2103, and D2105 is applied to the image signal of each of the color components of RGB. In other words, in a time period indicated by a reference numeral T24 for three sub-frames and including one image signal for each of the color components of RGB, the dither signal depending on the dither pattern D210 is added to this image signal, as in the time period T21.

(Configuration and Details of Control)

Next, a configuration and control of the display apparatus 200 according to the present embodiment are described more in detail, by focusing on, in particular, a portion of application of dither to an inputted image signal and a portion according to switching between the dither patterns.

For example, FIG. 15 is a block diagram illustrating an example of a functional configuration of the display apparatus according to the present embodiment, and illustrates an example of a configuration of each of the timing control section 202 and the dither signal addition section 207, focusing on the portion according to switching between the dither patterns for the image signal.

As illustrated in FIG. 15, information corresponding to each of the color components included in this image signal is inputted to the timing control section 202 in association with input of an image signal to the display apparatus 200 (e.g., the serial-parallel conversion section 203). For example, in a case where the image signals inputted to the display apparatus 200 are in such a configuration that the image signals corresponding to each of the color components of RGB are aligned in a time series, as in the example illustrated in FIG. 14, data on the image signal corresponding to each of the color components of RGB is included in the information inputted to the timing control section 202. It is to be noted that, in the following description, the above-described image signals inputted to the display apparatus 200 are assumed to be in such a configuration that the image signals corresponding to each of the color components of RGB are aligned in a time series. Further, the above-described information corresponding to each of the color components included in the image signal inputted to the timing control section 202 is also referred to as "RGB information" (RGB Information).

As a specific example, in the image signal corresponding to each of the color components inputted in predetermined order, for example, data indicating timing corresponding to a head of this order (i.e., data for synchronization) may be included in the RGB information. Such data enables, for example, the timing control section 202 to recognize to which color component the image signal for each of the color components inputted sequentially in the predetermined order corresponds.

Further, in another example, data indicating to which color component each of the image signals inputted sequentially for each of the color components corresponds may be included in the RGB information. Such data enables the timing control section 202 to recognize to which color component the image signal inputted sequentially corresponds.

It is to be noted that the above-described examples of the RGB information are merely examples, and do not necessarily limit a type and content of the data included in the RGB information. In other words, the data included in the RGB information is not limited to specific information, as long as the data enables the timing control section 202 to recognize to which color component the image signal inputted sequentially corresponds.

Further, the RGB information may be inputted to the display apparatus 200 as separate information different from the image signal. Furthermore, in another example, the RGB information may be acquired on the basis of the image signal inputted to the display apparatus 200. As a specific example, control information included in the image signal may be extracted as the RGB information.

The timing control section 202 includes a counter 2021 corresponding to each of the image signals for each of the color components, and a dither pattern distinguishing portion 2023 located in a subsequent stage of the counter 2021. For example, in the example illustrated in FIG. 15, the timing control section 202 includes counters 2021R, 2021G, and 2021B corresponding to the image signals of the color components of R, G, and B, respectively, as the counter 2021.

The counter 2021 counts the number of image signals corresponding to itself among the image signals for the respective color components inputted sequentially to the display apparatus 200, on the basis of the inputted RGB information. For example, the counter 2021R counts the number of image signals corresponding to the R component. Similarly, the counter 2021G counts the number of image signals corresponding to the G component. Further, the counter 2021B counts the number of image signals corresponding to the B component. It is to be noted that, in a case where the image signal for each of the color components is inputted for each sub-frame, the counter 2021 counts the number of sub-frames of the image signal for each of the color components that is a counting target. The counter 2021 then successively outputs counter values each depending on a result of the above-described counting, to the dither pattern distinguishing portion 2023 located in the subsequent stage.

The dither pattern distinguishing portion 2023 distinguishes the dither pattern of dither to be applied to the image signal, on the basis of the counter values successively outputted from the counter 2021 located in a previous stage, and notifies the dither signal addition section 207 of a result of this distinguishing. As a specific example, two types of the dither patterns D210 and D230 described above with reference to FIG. 9 and FIG. 11 are each set as a candidate for the dither pattern. In this case, for example, the dither pattern distinguishing portion 2023 selects one of the dither patterns D210 and D230 when the counter value is an even number, and selects the other dither pattern when the counter value is an odd number. It is to be noted that, in the following description, the dither pattern D210 is selected when the counter value is an even number, and the dither pattern D230 is selected when the counter value is an odd number.

Further, the counter 2021 resets the counter value when a reset signal RST is inputted. The dither pattern of dither to be applied to the image signal by processing in the subsequent stage is thereby reset. As a specific example, in the case of the example illustrated in FIG. 14, the reset signal RST is supplied to the counter 2021 for each frame. It is to be noted that details of the processing according to this reset is separately described later.

The image signal for each of the color components inputted sequentially to the display apparatus 200 is successively inputted to the dither signal addition section 207, after being converted from a serial signal into a parallel signal in the serial-parallel conversion section 203. On the basis of the dither pattern corresponding to the notification from the timing control section 202 (the dither pattern distinguishing portion 2023), the dither signal addition section 207 adds the dither signal to the image signal (i.e., the image signal for each of the color components) successively inputted. It is to be noted that, at this time, the dither signal addition section 207 may generate the dither pattern, depending on the notification (i.e., the result of distinguishing the dither pattern) from the timing control section 202.

The dither signal addition section 207 then successively outputs the image signal to which the dither signal is added, to the source driver (i.e., the source driver 205 illustrated in FIG. 13) located in a subsequent stage. It is to be noted that the subsequent processing is already described above and thus detailed description thereof is omitted.

Next, the example of the driving method of the display apparatus 200 according to the present embodiment is described in greater detail with reference to FIG. 16. FIG. 16 is a timing waveform diagram illustrating an example of the driving method of the display apparatus according to the present embodiment, and illustrates an example of control timing in a case where the display apparatus including the configuration described with reference to FIG. 15 is driven as in the example illustrated in FIG. 14. It is to be noted that, in FIG. 16, SFID, FID, and HFID are similar to those of the example described with reference to FIG. 10 and FIG. 12.

R count, G count, and B count each indicate a counter value based on the result of counting the image signals corresponding to the relevant one of the R component, the G component, and the B component. For example, "0" is set as an initial value to R count when the corresponding image signal (i.e., the image signal corresponding to the R component) is initially inputted, and thereafter, R count is incremented by one, each time this image signal is inputted. The same is applied to G count and B count.

Further, in the example illustrated in FIG. 16, FID is utilized as the reset signal RST to be supplied to the counter 2021 illustrated in FIG. 15. In other words, the results of counting for each of R count, G count and B count are successively reset at a rise and a fall of FID.

Furthermore, Dither indicates the dither pattern to be applied to the image signal. In other words, the dither pattern D210 described above is applied to the image signal in a case where a value of Dither is "0", and the dither pattern D230 described above is applied to the image signal in a case where the value of Dither is "1".

In the display apparatus including the configuration illustrated in FIG. 15, as described above, the dither pattern of the dither to be applied to the image signal is switched, depending on the result of counting the image signals corresponding to each of the color components of RGB. For this reason, for example, in the example illustrated in FIG. 16, "0" is set as the value of Dither, in a case where the counter value of each of R count, G count, and B count indicates an even number. In other words, in this case, the dither pattern D210 is applied to the image signal. Further, "1" is set as the value of Dither, in a case where the counter value of each of R count, G count, and B count indicates an odd number. In other words, in this case, the dither pattern D230 is applied to the image signal. It is to be noted that switching between the dither patterns such as the switching described above may be performed by the dither signal addition section 207, or may be performed by the timing control section 202 (e.g., the dither pattern distinguishing portion 2023). Further, among the configurations of the display apparatus, a main configuration (i.e., the dither signal addition section 207 or the timing control section 202 or both) of switching between the dither patterns corresponds to an example of "control section" according to control of dither pattern.

Such control enables the display apparatus 200 according to the present embodiment to switch the dither pattern to be applied to the image signal at each cycle, by using the period (i.e., three sub-frames) including one image signal for each of the R component, the G component, and the B component, as one cycle. In the display apparatus 200 according to the present embodiment, switching between the dither patterns is thereby performed at a cycle shorter than one frame. In other words, in the display apparatus 200 according to the present embodiment, it is possible to further shorten the cycle according to switching between the dither patterns, as compared with the example described with reference to FIG. 9 and FIG. 11.

It is to be noted that switching between the dither patterns may be controlled so that the presence or absence of application of dither to each of the pixels (i.e., the presence or absence of the addition of the dither signal) at each cycle of switching between the dither patterns is switched (e.g., reversed) in each predetermined time period longer than this switching cycle. For example, in the example illustrated in FIG. 16, the presence or absence of application of dither to each of the pixels at each cycle of switching between the dither patterns is controlled to be reversed every two frames (i.e., to set 0 to 1, and set 1 to 0). To be more specific, in the example illustrated in FIG. 16, in the first and second frames, "0" is set as the value of Dither in a case where the counter is an even number, and "1" is set as the value of Dither in a case where the counter is an odd number. In contrast, in the third and fourth frames, "1" is set as the value of Dither in a case where the counter is an even number, and "0" is set as the value of Dither in a case where the counter is an odd number. In other words, in the example illustrated in FIG. 16, the presence or absence of application of dither to each of the pixels is switched every two frames. Such a configuration makes it possible to achieve the DC balance for 1-bit dither, in addition to the DC balance of each of the color components.

It is to be noted that, in the present embodiment, the example of a case where a technique similar to that of the above-described first embodiment is described as a mechanism for achievement of the DC balance of each of the color components. In other words, in the example illustrated in FIG. 14 and FIG. 16, the control is performed so that the polarity of the data signal is reversed for each frame, and the DC balance of each of the color components is achieved in two consecutive frames. In contrast, in the display apparatus according to the present embodiment, the technique for achievement of the DC balance is not limited to a specific technique, as long as the dither pattern to be applied to an image signal is applied at a predetermined cycle including a plurality of sub-frames depending on the order in which this image signal for each of the color components is inputted. In other words, in the display apparatus according to the present embodiment, a technique different from that of the above-described first embodiment may be applied as the mechanism for achievement of the DC balance of each of the color components.

(Flow of Processing)

Next, an example of a flow of a series of steps in processing of the display apparatus 200 according to the present embodiment is described with reference to FIG. 17. FIG. 17 is a flowchart illustrating an example of the flow of the series of steps in the processing of the display apparatus 200 according to the present embodiment. It is to be noted that, in this description, the display apparatus 200 is assumed to include the configuration illustrated in each of FIG. 13 and FIG. 15. Further, in the example illustrated in FIG. 17, a technique similar to that of the above-described first embodiment is assumed to be applied as the mechanism for achievement of the DC balance of each of the color components. Furthermore, in this description, the image signals inputted to the display apparatus 200 are assumed to be in such a configuration that the image signals corresponding to each of the color components of RGB are aligned in a time series.

On the basis of the RGB information about the image signals sequentially inputted to each of the color components of RGB, the display apparatus 200 (the counter 2021) counts the image signals for each of these color components (S101). Further, the display apparatus 200 (the dither pattern distinguishing portion 2023) decides a dither pattern of dither to be applied to the image signal, depending on a counter value of the image signals for each of the color components (S103).

Further, the display apparatus 200 (the serial-parallel conversion section 203) converts the image signal for each of the color components sequentially inputted from a serial signal to a parallel signal. Furthermore, the display apparatus 200 (the dither signal addition section 207) adds a dither signal depending on the result of deciding the dither pattern, to this image signal (S105). The display apparatus 200 (the source driver 205) then generates a data signal (i.e., a data signal of a voltage depending on gray-scale indicated by this image signal) to be supplied to each of the pixels depending on the inputted image signal, by converting the digital image signal to which the dither signal is added, into an analog image signal (S107).

Next, the display apparatus 200 (the source driver 205) controls the polarity of the data signal generated on the basis of the inputted image signal, for each frame (S109). For example, the display apparatus 200 may control the polarity of the data signal to be reversed, between an even-numbered frame and an odd-numbered frame. The display apparatus 200 (the source driver 205) then supplies the data signal having the controlled polarity to each of the pixels (S111). In other words, an analog voltage depending on this data signal is written in this pixel. It is to be noted that each of the pixels supplied with the data signal is driven by being supplied with a drive signal at desirable drive timing. An image depending on this data signal is thereby displayed.

The example of the flow of the series of steps in the processing of the display apparatus 200 according to the present embodiment is described above with reference to FIG. 17.

3.3. Modification Examples

Next, modification examples of the display apparatus 200 according to the present embodiment are described.

Modification Example 1: Control Example in Color Sequential Drive in RGBW

In the described-above embodiment, the example of the control assuming the color sequential drive in the three colors of RGB is described. However, the technique according to the present embodiment is not limited to specific types of colors and a specific number of colors to be a display target, as long as the color sequential drive is performed. Thus, an example of control assuming the color sequential drive using four colors of RGB plus W (white) is described as a modification example 1.

For example, FIG. 18 is an explanatory diagram describing an example of a driving method of a display apparatus according to the modification example 1 of the present embodiment, and illustrates an example of the control assuming the color sequential drive using the four colors of RGBW. In the example illustrated in FIG. 18, data signals indicated by respective reference numerals D311$r$, D331$g$, D311$b$, D332$r$, D312$g$, and D332$b$ indicate the data signals provided with similar reference numerals in the example illustrated in FIG. 14. Further, a reference numeral D331$w$ and a reference numeral D312$w$ indicate a data signal of + polarity corresponding to a W component and a data signal of − polarity corresponding to the W component, respectively.

In the example illustrated in FIG. 18, image signals corresponding to the respective R, G, B, and W components are successively inputted in this order to the display apparatus 200. In the example illustrated in FIG. 18 based on such a premise, the technique according to the above-described first embodiment is applied to the display apparatus 200, and the display apparatus 200 performs control so that the DC balance of each of the color components is achieved within one frame. Specifically, the control is performed so that the DC balance of each of the color components is achieved within one frame, by reversing the polarity of the data signal every half frame (i.e., four sub-frames) including one image signal of each of the R component, the G component, the B component, and the W component.

Further, in the example illustrated in FIG. 18, by using a time period including one image signal of each of the R component, the G component, the B component, and the W component (i.e., four sub-frames) as one cycle, the display apparatus 200 switches a dither pattern to be applied to this image signal at this cycle.

Specifically, at first, the image signals of the respective R, G, B, and W components, which become sources of generation of the data signals D311$r$, D331$g$, D311$b$, and D331$w$ are successively inputted in this order to the display apparatus 200. Further, in the example illustrated in FIG. 18, dither depending on each of dither patterns D2101, D2103, D2105, and D2107 is applied to the image signal of each of the color components of RGBW. It is to be noted that the dither patterns D2101, D2103, D2105, and D2107 each correspond to the dither pattern D210 in the example illustrated in each of FIG. 9 and FIG. 11. In other words, in a time period indicated by a reference numeral T31 for four subframes and including one image signal for each of the color components of RGBW, the dither signal depending on the dither pattern D210 is added to this image signal.

Next, the image signals of the respective R, G, B, and W components, which become sources of generation of the data signals D332r, D312g, D332b, and D312w, are successively inputted in this order to the display apparatus 200. At this time, the dither pattern of dither to be applied to the image signal of each of the color components of RGBW is switched. Specifically, in the example illustrated in FIG. 18, dither depending on each of dither patterns D2301, D2303, D2305, and D2307 is applied to the image signal of each of the color components of RGBW. It is to be noted that the dither patterns D2301, D2303, D2305, and D2307 each correspond to the dither pattern D230 in the example illustrated in each of FIG. 9 and FIG. 11. In other words, in a time period indicated by a reference numeral T32 for four subframes and including one image signal for each of the color components of RGBW, the dither signal depending on the dither pattern D230 is added to this image signal.

Further, in the example illustrated in FIG. 18, the dither pattern of dither to be applied to the image signal is reset for each frame, as in the example described with reference to FIG. 14.

Furthermore, FIG. 19 is a timing waveform diagram illustrating the example of the driving method of the display apparatus according to the modification example 1 of the present embodiment, and illustrates an example of control timing in a case where the display apparatus is driven as in the example illustrated in FIG. 18. It is to be noted that, in FIG. 19, SFID, FID, HFID, Dither, R count, G count, and B count is similar to those in the example described with reference to FIG. 16. Further, W count indicates a counter value based on a result of counting the image signals corresponding to the W component. Furthermore, in the example illustrated in FIG. 19, FID is utilized as a reset signal RST of the counter, as in the example described with reference to FIG. 16. In other words, the results of counting are successively reset for each of R count, G count, B count, and W count, at a rise and a fall of FID.

Further, in the example illustrated in FIG. 19, "0" is set as the value of Dither, in a case where the counter value of each of R count, G count, B count, and W count indicates an even number. In other words, in this case, the dither pattern D210 is applied to the image signal. Further, "1" is set as the value of Dither, in a case where the counter value of each of R count, G count, B count, and W count indicates an odd number. In other words, in this case, the dither pattern D230 is applied to the image signal.

Such control makes it possible to apply the technique according to the present disclosure, even in a case where the color sequential drive using the four colors of RGBW is assumed.

The example of the control assuming the color sequential drive using the four colors of RGBW is described above as the modification example 1, with reference to FIG. 18 and FIG. 19.

Modification Example 2: Control Example about Application of Dither

Next, an example of control about application of dither to an image signal is described as a modification example 2. For example, in the described-above embodiment, there is described the example of the technique that enables expression of a halftone by applying dither under such a situation that the N-1-bit digital to analog conversion is performed on the N-bit image signal. Meanwhile, it is also possible to further reduce the number of bits of the processing for the digital to analog conversion to be performed on the N-bit image signal, to be a number less than N-1 bits. Thus, in the present modification example, an example of control is described that applies dither in a case where N-m-bit digital to analog conversion (m<N) is performed on the N-bit image signal is described.

For example, FIG. 20 is an explanatory diagram describing an outline of a display apparatus according to the modification example 2 of the present embodiment, and illustrates an example of signal processing of a portion where a data signal is generated on the basis of an image signal. As illustrated in FIG. 20, in the display apparatus according to the modification example 2, a dither signal is added to an inputted N-bit digital image signal, and the digital to analog conversion is performed on this image signal to which the dither signal is added. Further, in the example illustrated in FIG. 20, a resolution (i.e., the number of bits) of each of various kinds of processing to be performed on the inputted image signal, e.g., the processing according to the addition of dither and the processing according to the digital to analog conversion, is set to a number smaller 1 by m bit than that of the number of bits of this image signa.

Further, the addition of the dither signal to the image signal is controlled in each predetermined time period. It is to be noted that, in this description, the addition of the dither signal to the image signal is assumed to be controlled for each frame, for easy understanding of characteristics of the display apparatus according to the modification example 2. Furthermore, at this time, a frame to be a target for the addition of the dither signal is controlled depending on a difference between the number of bits of the image signal and the resolution (i.e., the number of bits) of signal processing (e.g., the processing according to the addition of dither and the processing according to the digital to analog conversion) to be performed on this image signal. Thus, a case is described with reference to FIG. 21 where the resolution of the processing of adding dither or the processing of the digital to analog conversion is smaller by 2 bits than the number of bits of the image signal. FIG. 21 is an explanatory diagram describing an example of the processing according to the application of dither to the image signal in the display apparatus according to the modification example 2 of the present embodiment, and schematically illustrates an example of a relationship between the inputted image signal and the signal after the dither application. It is to be noted that FIG. 21 illustrates an example where the number of bits of the input signal is 4, and the number of bits of the signal after the dither application is 2. Further, as for the signal after the dither application, a bit value for each frame in a time series is illustrated.

In a case illustrated in FIG. 21 where a 4-bit input signal is converted into a 2-bit signal, for example, information indicating trailing 2 bits is lost. In other words, in a case where the trailing 2 bits of the 4-bit input signal is "00" (e.g., in the case of "0000" or "0100"), reproduction is enabled even in the case of conversion into 2 bits. In contrast, in a case where the trailing 2 bits of the 4-bit input signal is each of "01", "10", or "11" (e.g., in the case of "0001", "0010", or "0011"), reproduction is difficult by using the 2-bit signal. For this reason, in the example illustrated in FIG. 21, a halftone that is difficult to be expressed with 2 bits is reproduced by adding the dither signal to the signal after conversion into 2 bits for each frame, depending on a bit value (i.e., gray-scale) of the 4-bit input signal.

Specifically, in the example illustrated in FIG. 21, a halftone that is difficult to be expressed with 2 bits (e.g., gray-scale between "00" and "01" indicated by a reference numeral D401) is reproduced by applying dither for each frame depending on the bit value of the input signal, using four frames as one set. Specifically, the number of frames to which dither is to be applied is controlled depending on the gray-scale to be expressed, in the second to fourth frames among the four frames.

For example, focusing on the first to fourth frames in the example illustrated in FIG. 21, dither is applied only in the second frame, in a case where the bit value of the input signal is "0001". In other words, in this case, the number of frames to which dither is to be applied among the first to fourth frames is 1. Further, in a case where the bit value of the input signal is "0010", dither is applied in the second frame and the third frame. In other words, in this case, the number of frames to which dither is to be applied among the first to fourth frames is 2. Furthermore, in a case where the bit value of the input signal is "0011", dither is applied in the second to fourth frames. In other words, in this case, the number of frames to which dither is to be applied among the first to fourth frames is 3.

Such control allows a user to visually recognize light of gray-scale corresponding to the bit value of "00" or light of gray-scale corresponding to the bit value of "01" in time division for each frame. Further, at this time, in the four frames, a proportion of each of the light of gray-scale corresponding to the bit value of "00" and the light of gray-scale corresponding to the bit value of "01" is controlled depending on the gray-scale of the input signal. The user thereby perceives the halftone between "00" and "00" (e.g., the light corresponding to the bit values of "0001", "0010" and "0011"), depending on the bit value of the input signal.

As described above, in the display apparatus according to the modification example 2, the application of dither to the image signal is controlled in time division, by using the number of frames depending on the number of halftones to be expressed, as one set. Even in a case where the difference between the number of bits of the image signal and the resolution to be performed on the image signal is 2 bits or more, expression of the halftone that is difficult to be expressed with this resolution is enabled by such a configuration. It is to be noted that although the case where the presence or absence of application of dither is controlled for each frame is described above as an example, the cycle of applying dither is not necessarily limited to each frame, as described above. As a specific example, the presence or absence of application of dither may be controlled at a cycle shorter than one frame.

The example of the control that applies dither to the image signal according to the modification example 2 is described above with reference to FIG. 20 and FIG. 21, by focusing on, in particular, the case where the N-m-bit digital to analog conversion (m<N) is performed on the N-bit image signal.

3.4. Evaluation

As described above, in the display apparatus according to the present embodiment, the dither signal is added to the image signal for each of the color components that is generated on the basis of each of the plurality of color components different from each other, and inputted in the predetermined order for each sub-frame included in a frame. Further, at this time, the display apparatus controls the pattern (i.e., the dither pattern) of the above-described dither signal, at each predetermined cycle including the plurality of sub-frames, depending on the above-described order in which the digital image signal of each of the above-described color components is inputted, within the above-described frame. Afterward, the display apparatus performs the digital to analog conversion of converting the digital image signal to which the dither signal is added into the analog image signal.

In the display apparatus according to the present embodiment, the above-described configuration allows for switching between the dither patterns at a shorter cycle (e.g., a period shorter than that in the example illustrated in each of FIG. 9 and FIG. 11). For this reason, in the display apparatus according to the present embodiment, it is possible to suppress appearance of flicker, in a case where the color sequential drive is performed. In particular, it is possible for the display apparatus according to the present embodiment to display an image in a more suitable manner, because it is not necessary to increase the switching cycle for the dither pattern even in a case where the control of the DC balance of each of the color components described above as the first embodiment is applied.

4. APPLICATION EXAMPLE

Next, an application example of a technique according to an embodiment of the present disclosure is described. For example, FIG. 22 is an explanatory diagram describing an application example of a display apparatus according to an embodiment of the present disclosure.

As illustrated in FIG. 22, a display apparatus 500 includes a sensor box 520, an output unit 530 for presentation of display information, and a main body 510 provided with a control section that controls various kinds of operation of the display apparatus 500.

The display apparatus 500 is, for example, installed above a table 540 or the like to face toward a top surface of the table 540. The display apparatus 500 causes the output unit 530 to project display information on a projection plane or the top surface of the table 540, and thereby presents the display information to a user. Additionally, the display apparatus 500 receives an operation performed on the projected display information from the user using the display apparatus 500. It is to be noted that a reference numeral M550 indicates a region (i.e., the projection plane) on which information (i.e., the display information) is to be projected by the output unit 530.

Further, the sensor box 520 is provided with a detection section 521, which may be a so-called sensor, that detects various kinds of information. The detection section 521 recognizes a content of an operation by the user using the display apparatus 500, a shape and a design of an object placed on the table 540, etc. For example, in the example illustrated in FIG. 22, the detection section 521 is installed to form a detection range from above the table 540 toward the top surface of the table 540. In other words, the detection section 521 is provided away from the table 540 that is a target for display of information.

As a specific example, the detection section 521 may be configured by a so-called ranging sensor. Further, in another example, the detection section 521 may be configured by, for example, a camera that images the table 540 using one imaging optical system (e.g., a series of lens groups), or may be a stereoscopic camera that images the table 540 using two imaging optical systems to record information about a depth direction. It is to be noted that, in this description, the detection section 521 is described to be configured as the so-called stereoscopic camera.

In a case where the stereoscopic camera is used as the detection section 521, for example, a visible light camera, an infrared camera, etc. may be applied to the stereoscopic camera. Using the stereoscopic camera as the detection section 521 enables the detection section 521 to acquire depth information. Because the detection section 521 acquires the depth information, the display apparatus 500 is enabled to detect, for example, a real object such as a hand or an object, etc. placed on the table 540. Further, because the detection section 521 acquires the depth information, the display apparatus 500 is enabled to detect contact or approach of an operation body such as a hand of the user to the table 540, and removal of the operation body from the table 540.

Such a configuration enables the display apparatus 500 to recognize an operation by the operation body such as a hand of the user, etc. performed on the display information projected on the region M550 on the top surface of the table 540, and execute various functions depending on a content of this operation.

In the display apparatus 500 illustrated in FIG. 22, for example, in a case where the color sequential drive is adopted as a drive system of the output unit 530, it is possible to apply the technique according to each of the above-described embodiments. In other words, it is also possible to apply the technique according to the above-described first embodiment, as the mechanism for achievement of the DC balance of each of the color components. Further, in a case where dither is applied to an image signal, it is also possible to apply the technique according to the above-described second embodiment, to the control of switching dither patterns.

Further, it is possible to apply the technique according to each of the embodiments of the present disclosure to a display apparatus as long as the display apparatus adopts the color sequential drive. For this reason, the display apparatus to which the technique according to the present embodiment is applied is not necessarily limited to only the projection-type display apparatus described above. As a specific example, it is possible to apply the technique according to the present embodiment to a display of so-called head mount type, such as a HMD (Head Mounted Display) or an eyeglass-type wearable device, as long as this display adopts the color sequential drive. Further, it is possible to apply the technique according to the present embodiment to a head-up display to be adopted as a vehicle-mounted display, etc., an electronic viewfinder to be adopted in an imaging apparatus such as a digital camera, and the like. Furthermore, it is also possible to apply the technique according to the present embodiment to a general liquid crystal display, in a case where this display adopts the color sequential drive.

5. CONCLUSION

Details of suitable embodiments of the present disclosure are described above with reference to the accompanying drawings, but the technical scope of the present disclosure is not limited to such examples. It is apparent that a person with ordinary skill in the art of the present disclosure may conceive a variety of alterations and modifications within the category of the technical idea described in the scope of claims, and it is understood that these shall, of course, belong to the technical scope of the present disclosure.

Further, the effects described in the present specification are merely explanatory and exemplified, and are not limitative. In other words, the technology according to the present disclosure may produce other effects apparent to the person skilled in the art of the present specification, together with the above-described effects or in place of the above-described effects.

It is to be noted that the following configurations may also belong to the technical scope of the present disclosure.

(1)

A display apparatus including:

an addition section that adds a dither signal to a digital image signal for each of a plurality of color components, the digital image signal being generated on a basis of each of the plurality of color components different from each other, and inputted in predetermined order for each sub-frame included in a frame;

a conversion section that performs digital to analog conversion of converting the digital image signal to which the dither signal is added into an analog image signal; and a control section that controls a pattern of the dither signal, at each predetermined cycle including a plurality of the sub-frames, depending on the order in which the digital image signal for each of the color components is inputted, within the frame.

(2)

The display apparatus according to (1), in which a length of the cycle is shorter than a length of the frame.

(3)

The display apparatus according to (1) or (2), in which the cycle is set to assign the digital image signals corresponding to the color components different from each other, to respective sub-frames adjacent to each other.

(4)

The display apparatus according to any one of (1) to (3), further including a signal processing section that generates a data signal to be written in a pixel, on a basis of an image signal, in which the cycle is a first cycle, and the signal processing section controls a polarity of the data signal at every second cycle having a length longer than or equal to the first cycle.

(5)

The display apparatus according to (4), in which the length of the second cycle is a length of a frame unit.

(6)

The display apparatus according to (4) or (5), in which the addition section performs control to switch between presence and absence of addition of the dither signal to each pixel at the first cycle, at a third cycle having a length longer than the first cycle.

(7)

The display apparatus according to any one of (1) to (6), in which a number of bits of the digital to analog conversion is smaller than a number of bits of the digital image signal.

(8)

The display apparatus according to any one of (1) to (7), in which the plurality of color components includes an R component, a G component, and a B component.

(9)

The display apparatus according to any one of (1) to (8), further including a projection section that projects an image based on the analog image signal on a projection plane and thereby displays the image.

(10)

A display apparatus including:

a signal processing section that controls a polarity of a data signal based on an image signal for each of a plurality of color components, the image signal being generated on a basis of each of the plurality of color components different from each other, and inputted in predetermined order for each sub-frame included in a frame, at predetermined cycle including a plurality of sub-frames; and a control section that controls operation of a pixel on a basis of the data signal having the controlled polarity.

(11)

The display apparatus according to (10), in which a length of the predetermined cycle is a cycle of a frame unit.

(12)

The display apparatus according to (10) or (11), in which the data signals corresponding to the color components different from each other are assigned to respective sub-frames adjacent to each other.

(13)

The display apparatus according to any one of (10) to (12), further including a projection section that projects an image based on the image signal on a projection plane and thereby displays the image.

(14)

A driving method of a display apparatus, the driving method including:

causing a computer to add a dither signal to a digital image signal for each of a plurality of color components, the digital image signal being generated on a basis of each of the plurality of color components different from each other, and inputted in predetermined order for each sub-frame included in a frame;

causing the computer to perform digital to analog conversion of converting the digital image signal to which the dither signal is added into an analog image signal; and causing the computer to control a pattern of the dither signal, at each predetermined cycle including a plurality of the sub-frames, depending on the order in which the digital image signal for each of the color components is inputted, within the frame.

(15)

A driving method of a display apparatus, the driving method including:

causing a computer to control a polarity of a data signal based on an image signal for each of a plurality of color components, the image signal being generated on a basis of each of the plurality of color components different from each other, and inputted in predetermined order for each sub-frame included in a frame, at predetermined cycle including a plurality of sub-frames; and causing the computer to control operation of a pixel on a basis of the data signal having the controlled polarity.

EXPLANATION OF REFERENCE NUMERALS 100 display apparatus
110 light source
130 optical system
150 light modulation device
200 display apparatus
201 display panel
202 timing control section
2021, 2021G, 2021G, 2021B counter
2023 dither pattern distinguishing portion
203 serial-parallel conversion section
204 gamma circuit
205 source driver
206 gate driver
207 dither signal addition section

The invention claimed is:

1. A display apparatus comprising:
an addition section configured to add a dither signal to a digital image signal for each of a plurality of color components, wherein the digital image signal is generated based on each of the plurality of color components that are different from each other, and wherein the digital image signal for each of the plurality of color components is inputted in predetermined order for each sub-frame included in a frame,
a conversion section configured to perform digital to analog conversion to convert the digital image signal, to which the dither signal is added, into an analog image signal;
a control section configured to control a pattern of the dither signal, at each predetermined cycle, based on the predetermined order in which the digital image signal for each of the plurality of color components is inputted, within the frame; and
a signal processing section configured to:
generate a data signal to be supplied to each pixel associated with the display apparatus based on the digital image signal inputted for each of the plurality of color components, wherein the predetermined cycle is a first cycle, and
control a polarity of the data signal at every second cycle having a length longer than or equal to the first cycle, wherein the addition section is further configured to perform control to switch between presence and absence of the addition of the dither signal to each pixel is performed at a third cycle, which has a length longer than the first cycle.

2. The display apparatus according to claim 1, wherein a length of the predetermined cycle is shorter than a length of the frame.

3. The display apparatus according to claim 1, wherein the predetermined cycle is set to assign the digital image signals corresponding to the plurality of color components that are different from each other, to respective sub-frames adjacent to each other.

4. The display apparatus according to claim 1, wherein the length of the second cycle is a length of a frame unit.

5. The display apparatus according to claim 1, wherein the control to switch between the presence and the absence of the addition of the dither signal to each pixel is performed at the first cycle, and at the third cycle.

6. The display apparatus according to claim 1, wherein a number of bits of the digital to analog conversion is smaller than a number of bits of the digital image signal.

7. The display apparatus according to claim 1, wherein the plurality of color components includes an R component, a G component, and a B component.

8. The display apparatus according to claim 1, further comprising a projection section configured to project an image based on the analog image signal on a projection plane and thereby display the image.

9. The display apparatus according to claim 1, wherein the control to switch between the presence and the absence of the addition of the dither signal to each pixel is further performed at the second cycle.

10. A driving method of a display apparatus, the driving method comprising:
causing a computer to add a dither signal to a digital image signal for each of a plurality of color components, wherein the digital image signal is generated based on each of the plurality of color components that are different from each other, and wherein the digital image signal for each of the plurality of color components is inputted in predetermined order for each sub-frame included in a frame;
causing the computer to perform digital to analog conversion to convert the digital image signal, to which the dither signal is added, into an analog image signal;
causing the computer to control a pattern of the dither signal, at each predetermined cycle, based on the predetermined order in which the digital image signal for each of the plurality of color components is inputted, within the frame;
causing the computer to generate a data signal to be supplied to each pixel associated with the display apparatus based on the digital image signal inputted for each of the plurality of color components, wherein the predetermined cycle is a first cycle;
causing the computer to control a polarity of the data signal at every second cycle having a length longer than or equal to the first cycle; and
causing the computer to perform control to switch between presence and absence of the addition of the dither signal to each pixel is performed at a third cycle, which has a length longer than the first cycle.

11. A display apparatus comprising:
an addition section configured to add a dither signal to a digital image signal for each of a plurality of color components, wherein the digital image signal is generated based on each of the plurality of color components that are different from each other, and wherein the digital image signal for each of the plurality of color components is inputted in predetermined order for each sub-frame included in a frame;
a conversion section configured to perform digital to analog conversion to convert the digital image signal, to which the dither signal is added, into an analog image signal;
a control section configured to control a pattern of the dither signal, at each predetermined cycle including a plurality of sub-frames, based on the predetermined order in which the digital image signal for each of the plurality of color components is inputted, within the frame; and
a signal processing section configured to:
generate a data signal to be supplied to each pixel associated with the display apparatus based on the digital image signal inputted for each of the plurality of color components, wherein the predetermined cycle is a first cycle, and
control a polarity of the data signal at every second cycle having a length longer than or equal to the first cycle, wherein the addition section is further configured to perform control to switch between presence and absence of the addition of the dither signal to each pixel at the first cycle, at a third cycle that has a length longer than the first cycle.

\* \* \* \* \*